July 7, 1936. E. E. KLEINSCHMIDT ET AL 2,046,328
FACSIMILE PRINTING TELEGRAPH SYSTEM AND APPARATUS
Filed Aug. 14, 1930 10 Sheets-Sheet 5
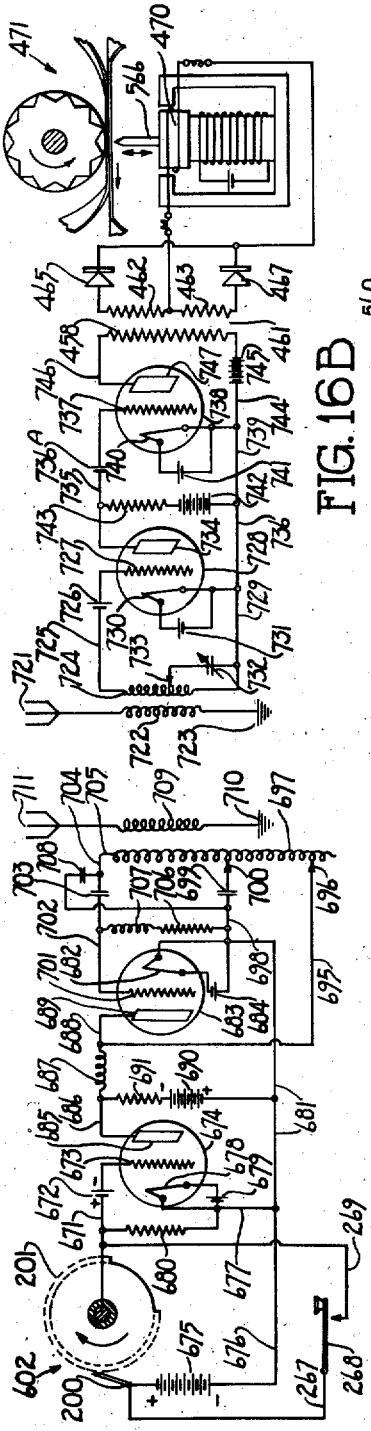
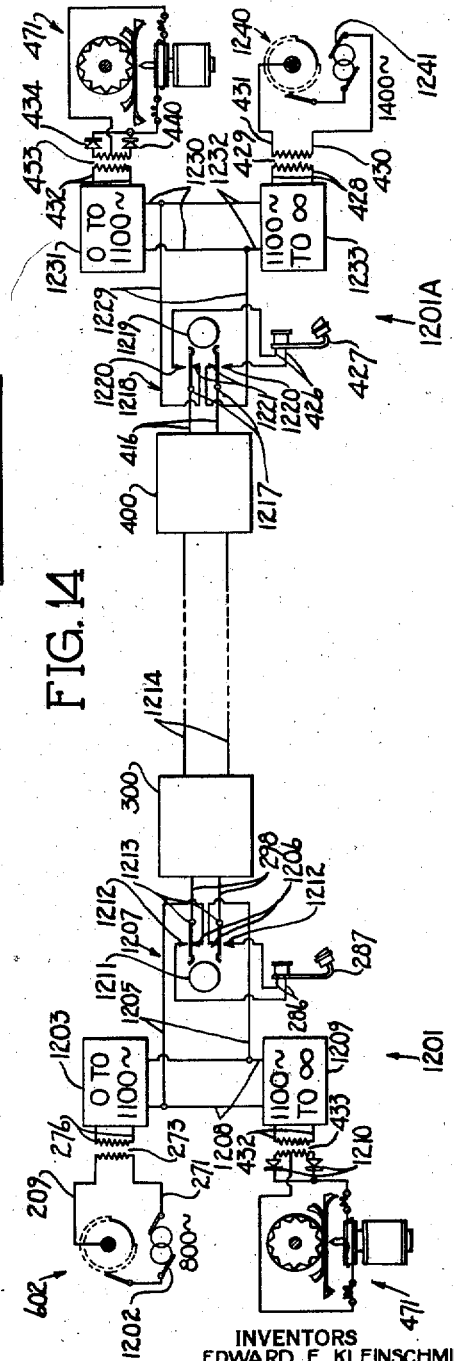
INVENTORS
EDWARD E. KLEINSCHMIDT
AND EDWARD F. KLEINSCHMIDT
BY
ATTORNEYS July 7, 1936.    E. E. KLEINSCHMIDT ET AL    2,046,328
FACSIMILE PRINTING TELEGRAPH SYSTEM AND APPARATUS
Filed Aug. 14, 1930    10 Sheets-Sheet 6
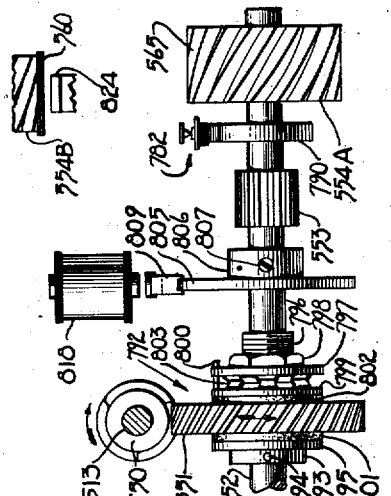
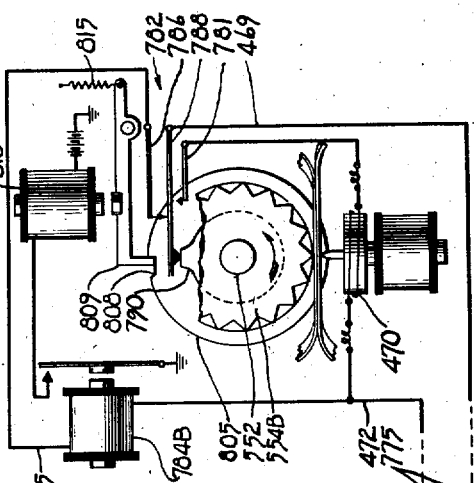
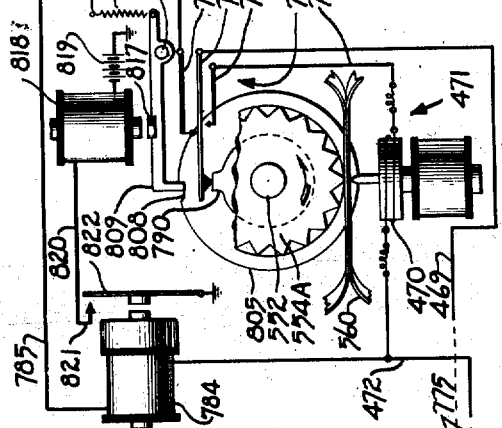
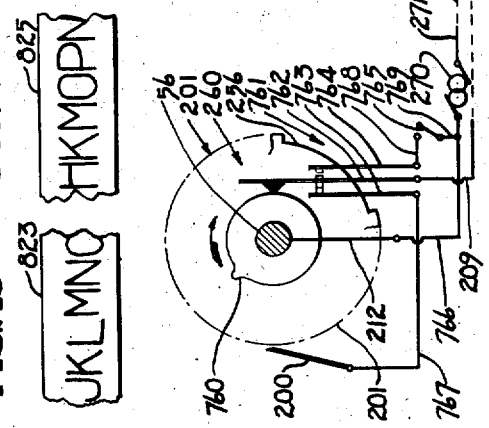
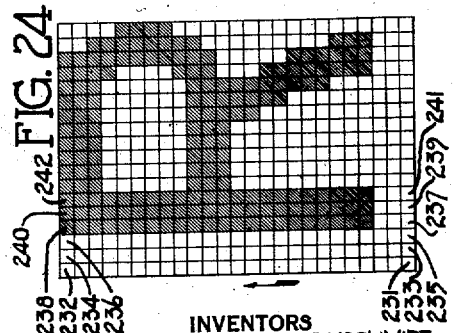
INVENTORS
EDWARD E. KLEINSCHMIDT
AND EDWARD F. KLEINSCHMIDT
BY Strauch & Hoffman
ATTORNEYS July 7, 1936. E. E. KLEINSCHMIDT ET AL 2,046,328
FACSIMILE PRINTING TELEGRAPH SYSTEM AND APPARATUS
Filed Aug. 14, 1930 10 Sheets-Sheet 7
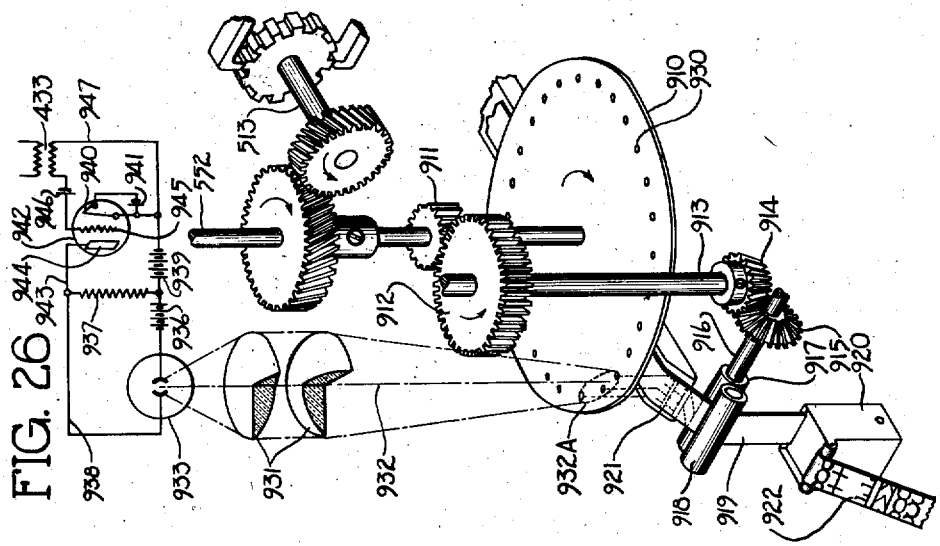
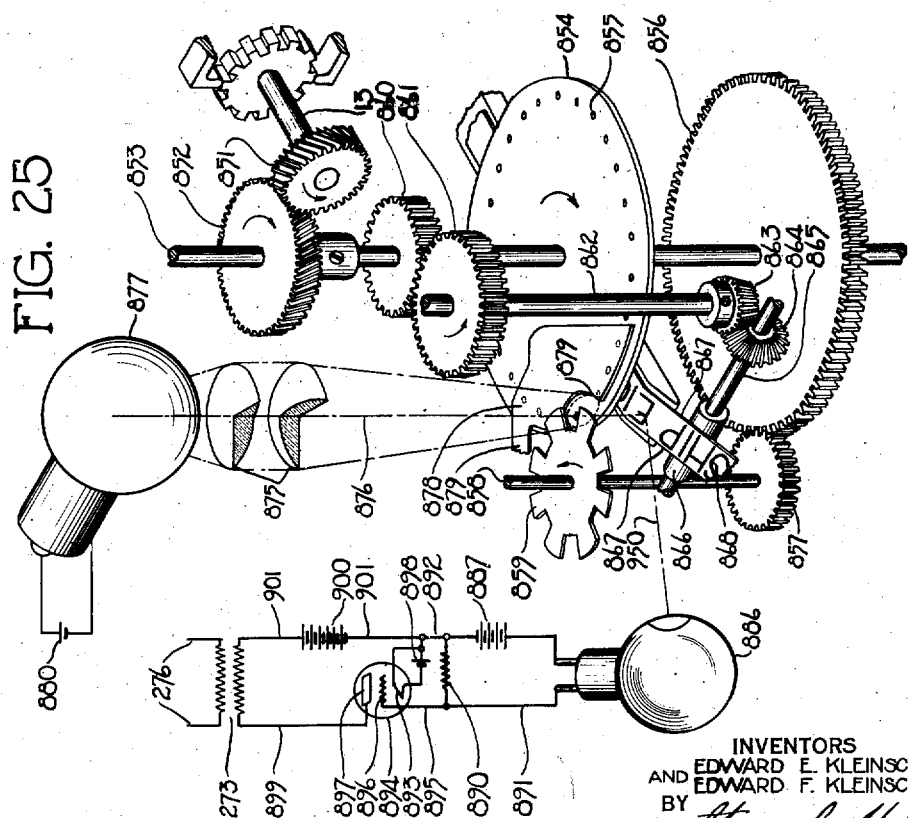
INVENTORS
EDWARD E. KLEINSCHMIDT
AND EDWARD F. KLEINSCHMIDT
BY
Strauch & Hoffman
ATTORNEYS

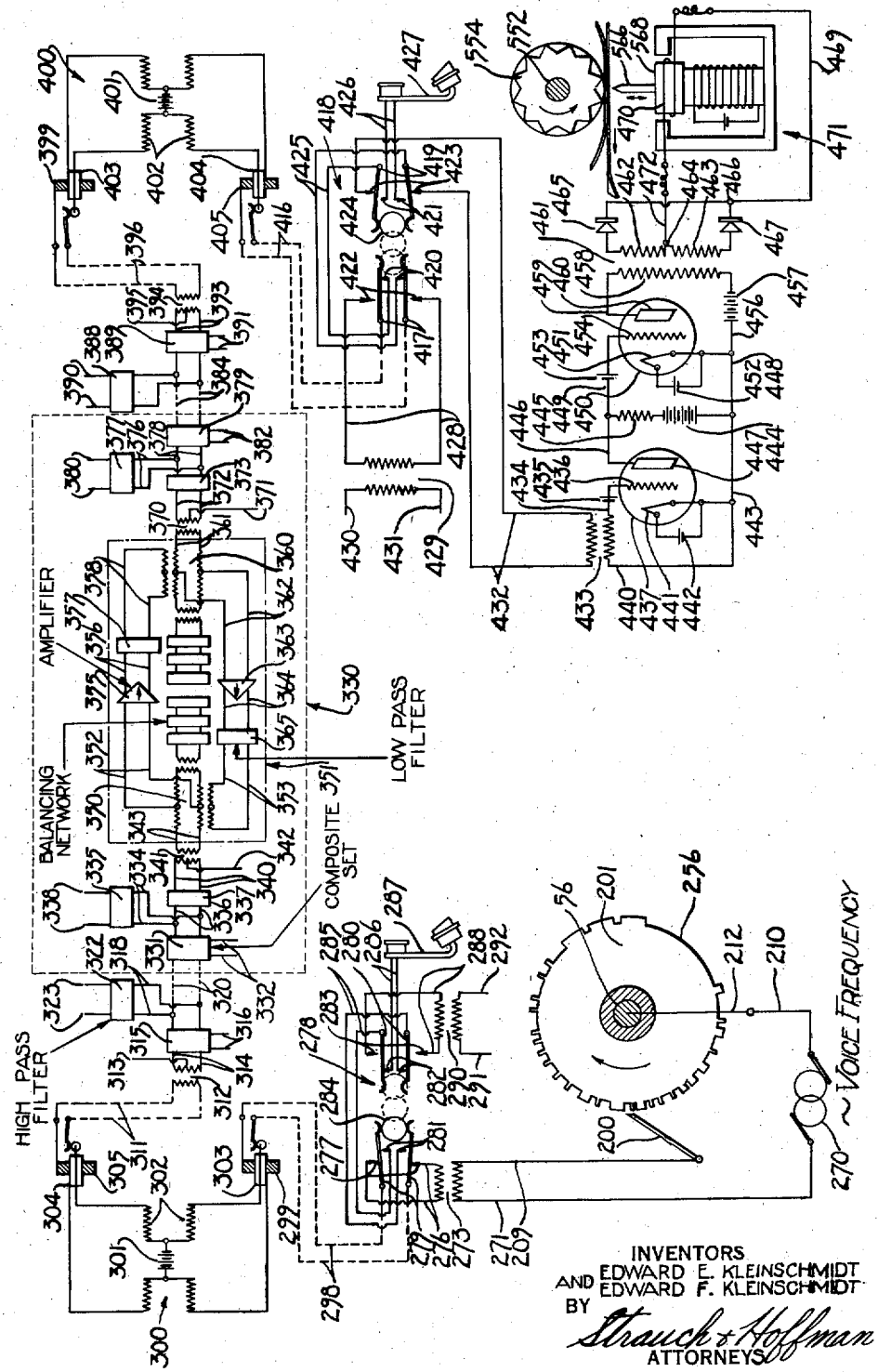

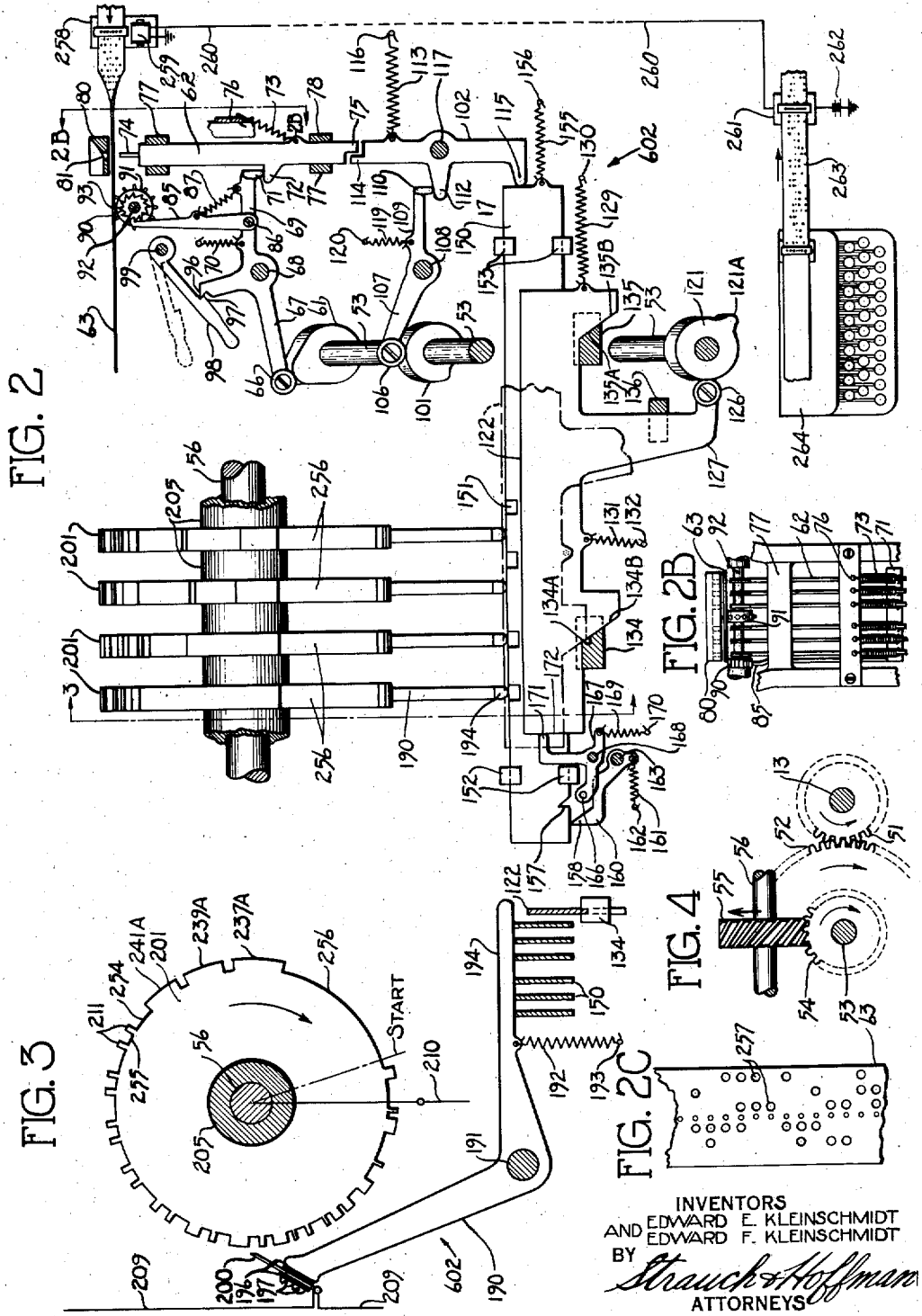

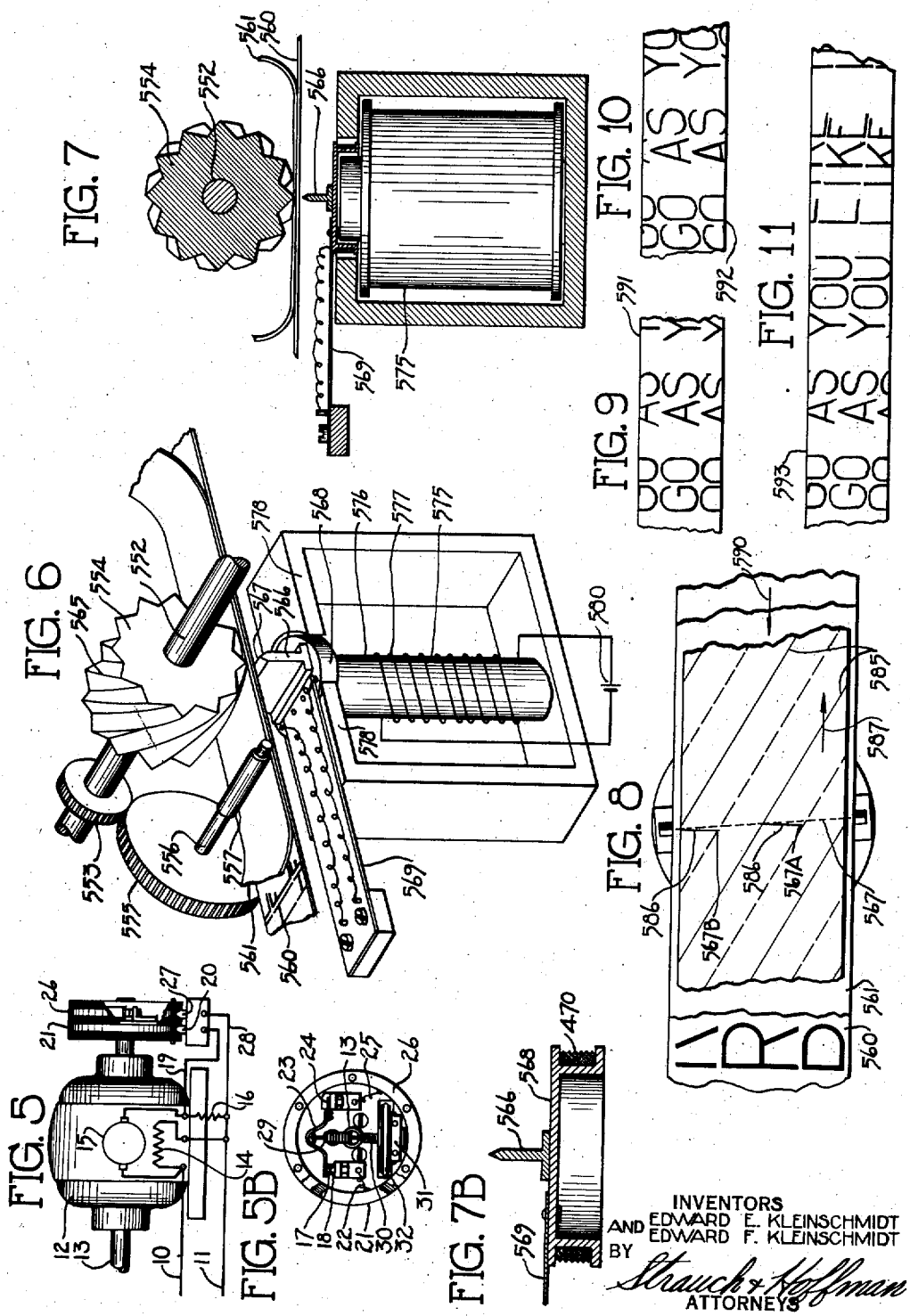

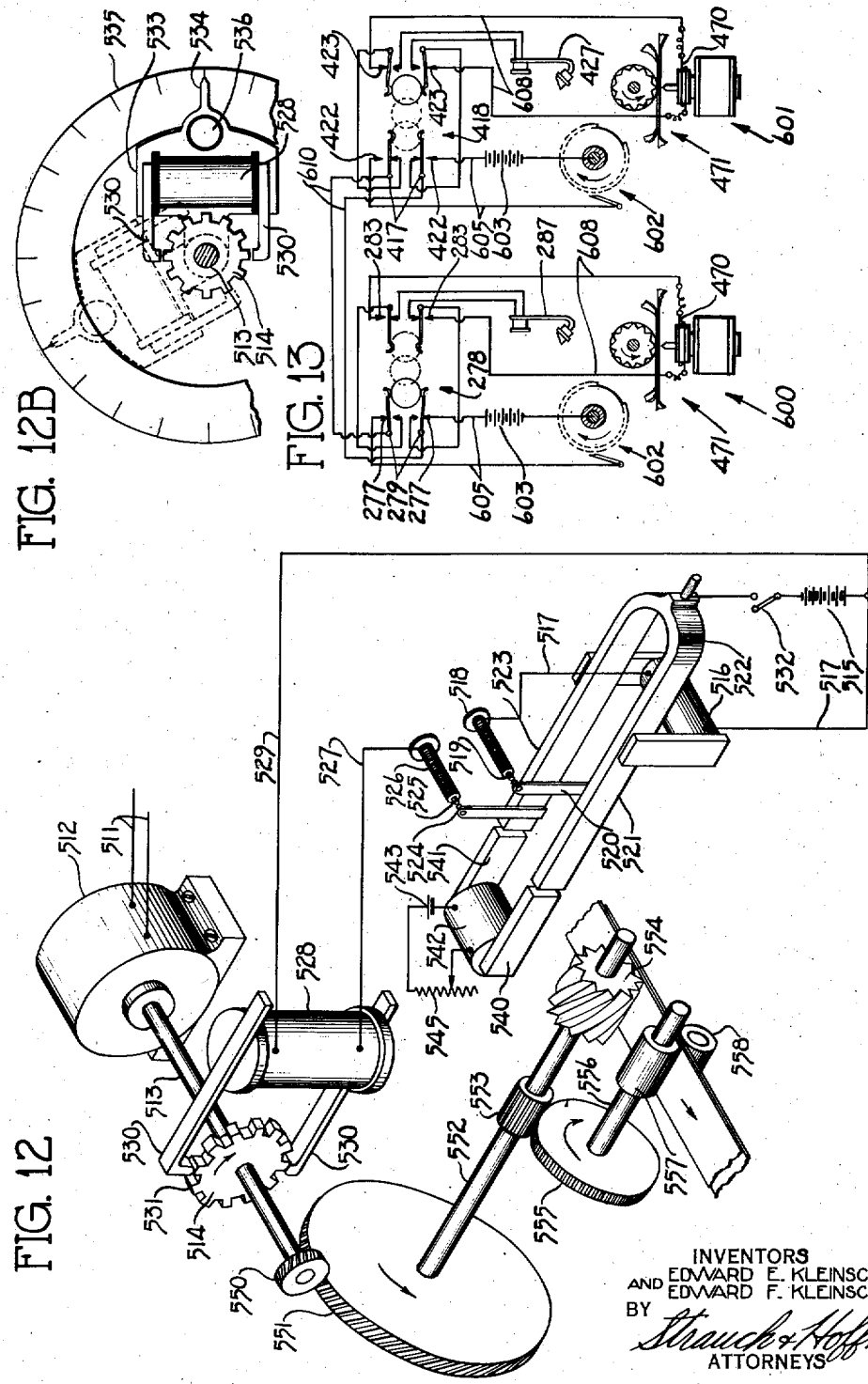

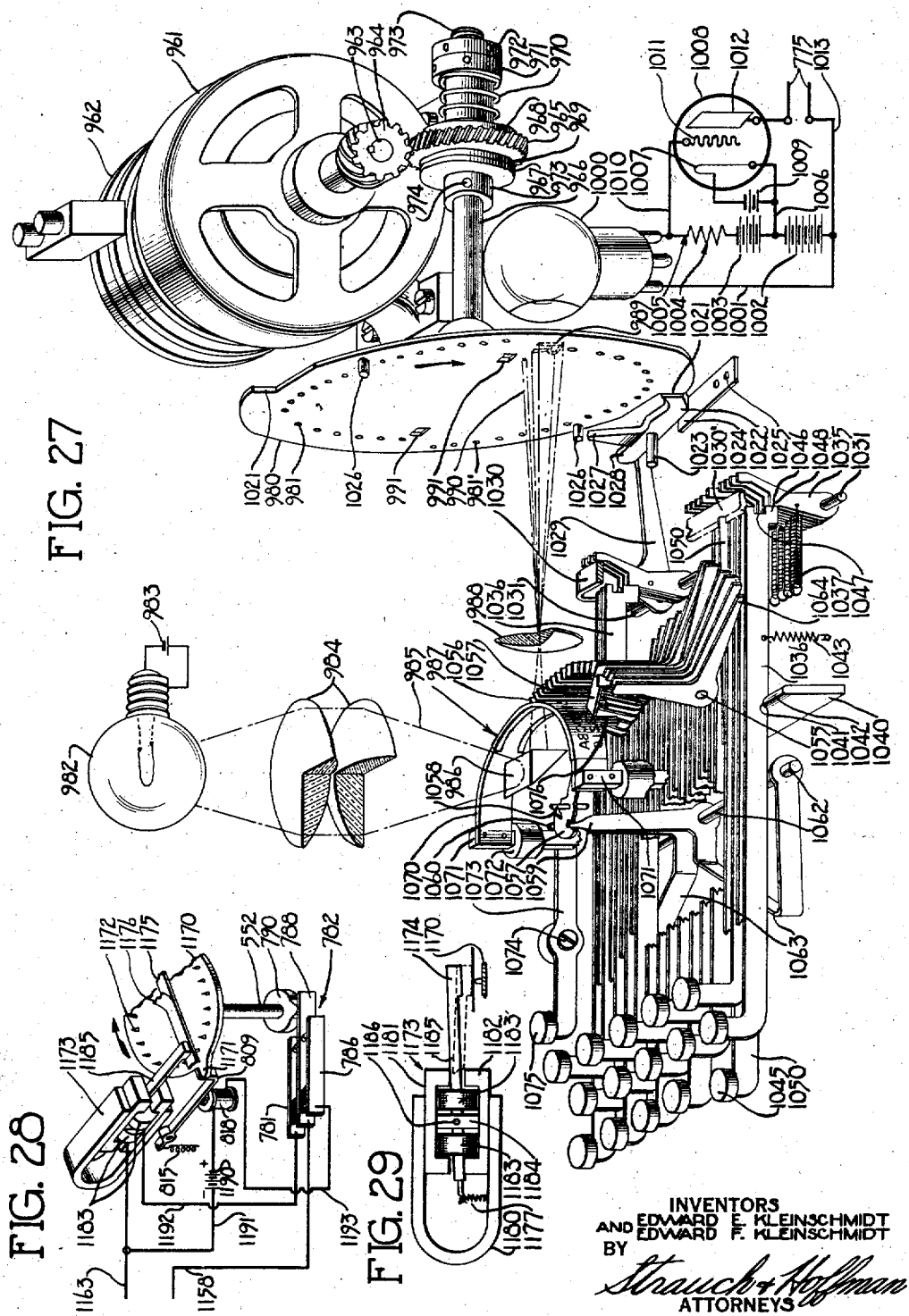

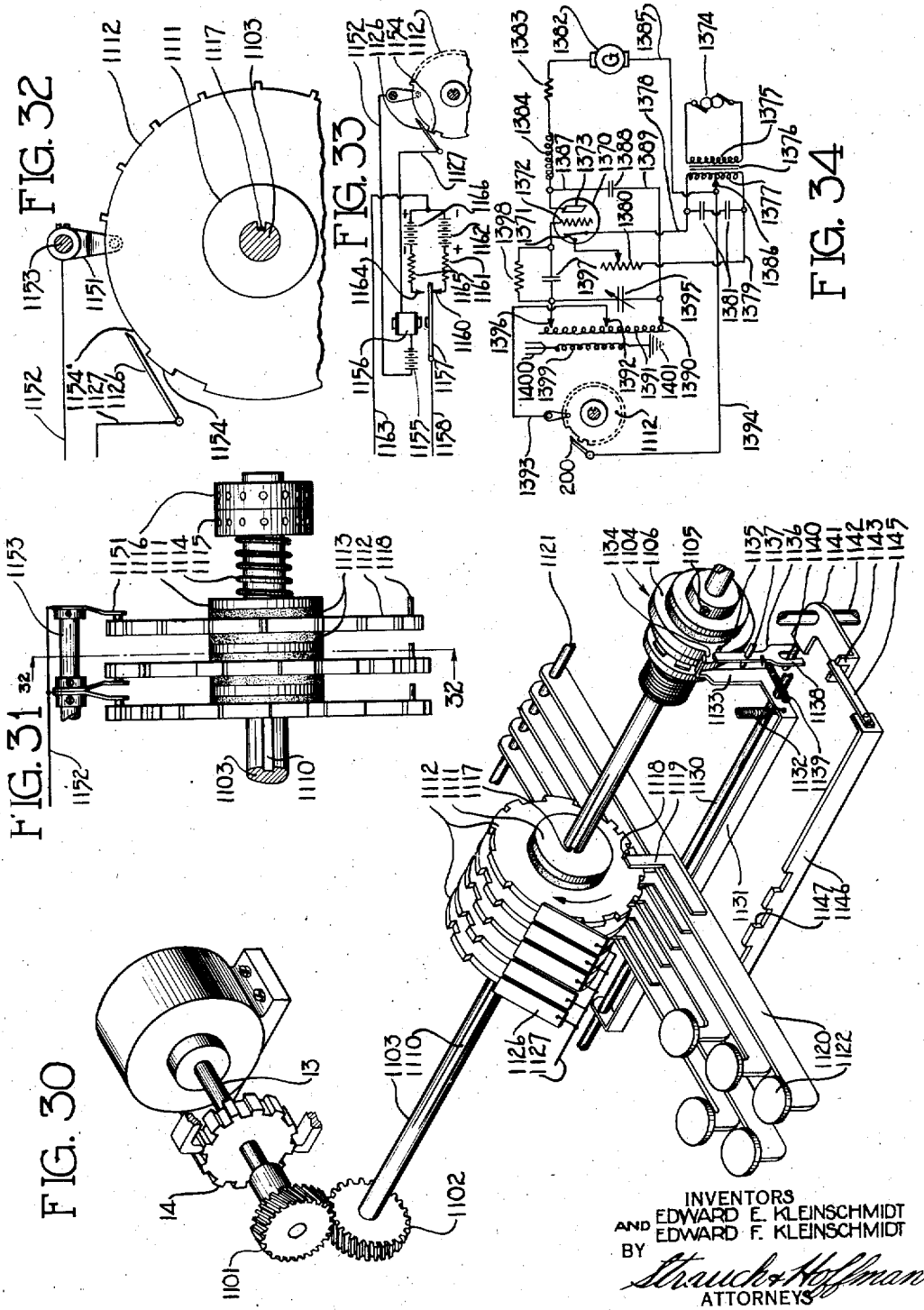

July 7, 1936.  E. E. KLEINSCHMIDT ET AL  2,046,328
FACSIMILE PRINTING TELEGRAPH SYSTEM AND APPARATUS
Filed Aug. 14, 1930   10 Sheets-Sheet 10
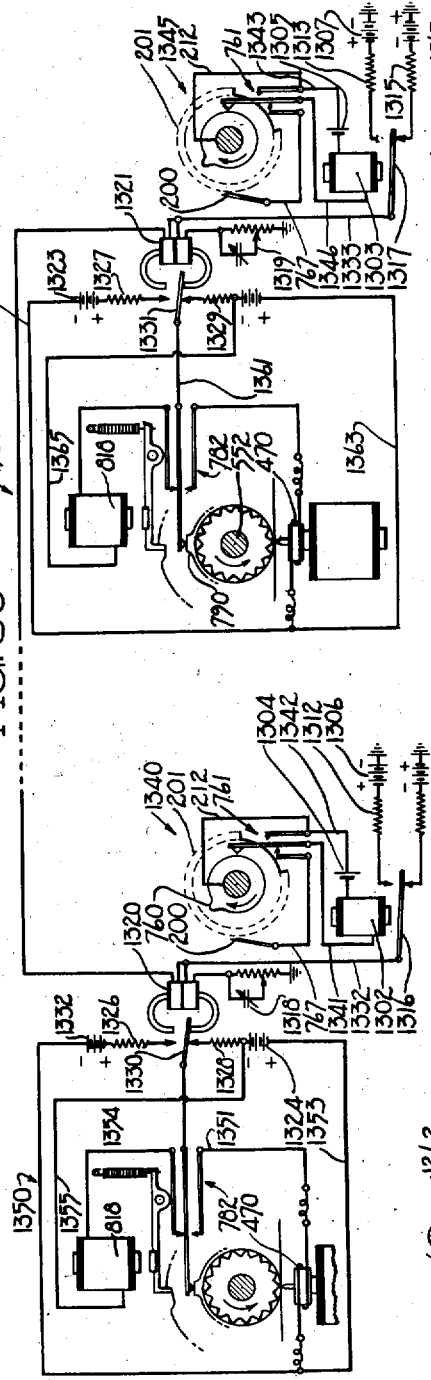
FIG. 35
FIG. 36
FIG. 37
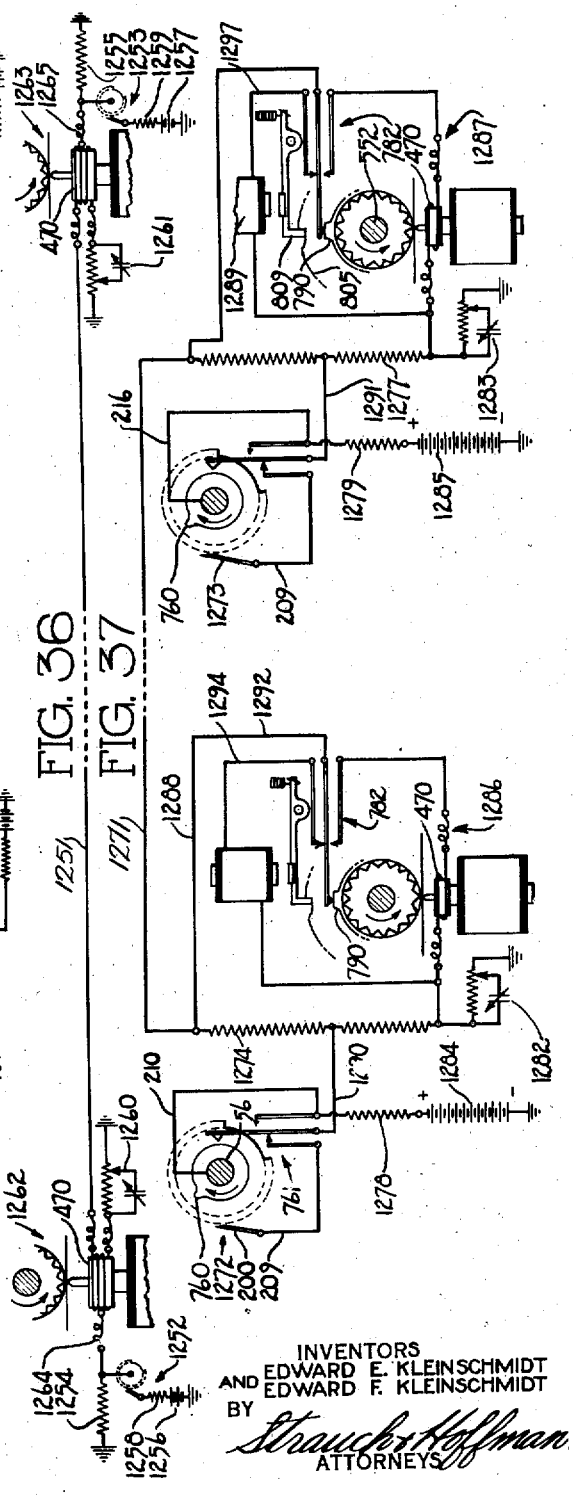
INVENTORS
EDWARD E. KLEINSCHMIDT
AND EDWARD F. KLEINSCHMIDT
BY
Strauch & Hoffman
ATTORNEYS Patented July 7, 1936

2,046,328

UNITED STATES PATENT OFFICE 2,046,328

FACSIMILE PRINTING TELEGRAPH SYSTEM AND APPARATUS

Edward E. Kleinschmidt and Edward F. Kleinschmidt, Chicago, Ill., assignors to Teletype Corporation, Chicago, Ill., a corporation of Delaware Application August 14, 1930, Serial No. 475,264

30 Claims. (Cl. 178—5)

The present invention pertains to novel telegraphic systems and apparatus therefor of the automatic type. More particularly the present invention relates to systems in which records of transmitted material are made in directly legible characters either of any plain language, code characters or telegraphic code, and the invention is especially useful in radio signalling systems, as well as for use on carrier, voice frequency and the usual telegraph signalling channels.

Our invention pertains more specifically to telegraph systems in which each letter or symbol is scanned or analyzed into a succession of constituent elemental areas of positive and negative surfaces. The positive or negative nature of each such elemental area then is communicated by a telegraphic signal from the sender to the receiver and is recorded upon a receiving surface according to the nature of the signal.

In the early years of telegraphic communication, prior to about 1870, signalling lines were comparatively short and traffic was not heavy. As a result the provision of channels to carry the traffic was not a problem, and comparatively low speed and more or less simple apparatus for facsimile transmission was extensively developed.

As the length of lines and telegraphic message traffic increased the facsimile methods of transmission became too slow and wasteful of line time, and to speed transmission, multiplex signalling channels with automatic permutation code printing telegraphs were actively developed beginning about the year 1870. These systems of telegraphy had such manifest advantages of increased speed and utilization of existing channels for line wire signalling that the facsimile methods of transmission were almost replaced completely thereby for a long period of years, and the permutation code telegraphs today dominate line wire telegraphy. Increasing communication needs, however, have been forcing higher speed operation of permutation code telegraphs and the development of such apparatus to a high state of perfection, together with the development of additional channels for communication.

Modern development of communication channels has progressed to the point where a single conductor is no longer limited to a single type of telegraphy. Different types of electrical currents of different frequencies, each available for a different use or even for several uses, as for example, for simultaneous transmission of varied types of telegraphic and telephonic message material, electrical power, remote control currents and the like are now impressed on a common conductor. In these new methods of communication, electronic tubes play an important part, providing for detection and amplification of very weak currents, and for the generation and modulation of high frequency and oscillating current, providing a greatly increased number of channels available for communication purposes.

These channels of communication offer new opportunities through radio transmission, wired wireless and carrier frequency signalling over power circuits, and voice frequency signalling over telephone circuits, to reach a vast number of individuals with telegraphic communication and message recording equipment. However, in the modern radio and carrier frequency channels of communication, because of the minute currents necessarily utilized, disturbances of a nature that do not interfere with ordinary line wire permutation code telegraphy, such as fading, static, interference from power generation, and the like, are sufficiently serious to vary the nature of received permutation code signals and to interfere with such transmission. Existing permutation code type-printing telegraphs are therefore more or less unsatisfactory for use on these newly developed channels of communication.

To utilize in small part these new channels of transmission, facsimile systems particularly for photographic transmission of picture and message material, have been revived. Such systems, as so far developed, are inefficient in the utilization of the channels, and require complicated photo-electric apparatus, and highly accurate methods of synchronization to maintain reasonably satisfactory operation. Such systems are too costly and inefficient to permit their effective use in the transmission of ordinary message material, or for wide spread use in broadcast service. They are limited largely to large station equipment and expensive communication service.

The present invention includes novel systems and apparatus especially adapted to take full advantage of existing channels of radio, carrier frequency, telephonic, telegraphic and like communication to reach a maximum number of users, and to provide for high speed, accurate and novel telegraphic transmission of message material or intelligence, with all of the advantages of high speed type printing and facsimile telegraphy. This invention provides improved, simplified and reliable apparatus suitable for higher speed operation than has heretofore been commercially possible in either facsimile or permutation code type printing telegraphs, and operable effectively over radio, carrier frequency, telephonic and like channels. By a combination of the desirable features of prior methods of type printing and facsimile transmission novel methods and apparatus are provided adaptable for signalling with currents within the range of voice frequency and over the highly perfected modern radio and voice transmission circuits with receiving and recording devices so sensitive that signals within the voice frequency range are accurately and rapidly recorded.

Furthermore, by our novel system and apparatus we are enabled to make more effective use of existing channels of communication such as radio, telephone and power circuits and apparatus, permitting messages from distant stations to be directly transmitted to those to whom they are addressed without the necessity of manual delivery of the copied message. This novel apparatus is admirably adapted for local message distribution from long distance high speed permutation code type telegraph circuits by translation of permutation code messages from distant stations in local relay stations, and reproduction in facsimile form in the home or office of the person to receive the message by signals transmitted over existing channels of communication such as radio, telephone or similar channels.

Our invention embodies receiving mechanism of such improved character that the high accuracy of synchronizing required in the prior art is obviated to such an extent that the reasonable correspondence of speeds required for accurate high speed operation may be attained without complicated or expensive mechanism.

Our invention partakes of the nature of facsimile telegraphs, but by a combination of methods peculiar primarily to type-printing telegraphs and by making the facsimile features more direct, yet suitable for high-speed operation, the advantages of the two prior general types of transmission have been attained in one system. Where the system of our invention may be limited to the transmission of a fixed set of characters such as letters and numerals, we achieve a high accuracy by providing a system of mechanical prescanning.

A general object of our invention is to provide novel complete operating systems and apparatus for making high speed facsimile records with improved simplified reliable and low cost apparatus adaptable to wide spread use through channels of communication recently developed.

Another general object of our invention is to provide a complete operating system for making a duplicate record of matter composed of a series of unit symbols, in which predetermined control elements are provided for each symbol and the record is directly recorded by the signals received at the receiving station.

The more specific objects of our invention are:

To provide a system which is also especially suitable for use with radio and carrier frequency transmission due to its directness and simplicity; to provide a system in which the effects of static, fading and other disturbances in radios, carrier signalling systems on the legibility of the record are minimized; and to provide a recorder that may be used in place of the loud speaker in an ordinary broadcast radio receiving set, thereby permitting widespread distribution of intelligence in recorded legible form via radio, wired wireless and carrier frequency transmission over existing telephone, power and like existing circuits without interfering with the existing functions thereof.

To provide novel synchronization methods and apparatus in which the speed control is similar in the sender and receiver, in which the speed of the sender is preferably independent of the signals, and the speed of the receiver is not affected by extraneous interfering impulses in the signal circuit and the speed of the receiver may be adjusted by observing the record of the signals themselves.

To provide a novel receiver embodying a start-stop mechanism under control of the transmitter wherein the start-stop signal impulses function in a novel manner as an automatic speed control for the receiver, thus avoiding the necessity for complicated and expensive speed control mechanism.

To provide novel senders in which prescanning is embodied and an element is provided for each symbol to control the starting and stopping of the receiver and may be brought into operation by a keyboard, a perforated tape control, or by any of the well known methods of control used in typewriting telegraphs.

To provide senders which will produce signals, the smallest elements of which are composed of alternating current and of such a frequency that it can be transmitted on circuits designed primarily for the telephone or voice frequency currents, as for example, duplexed telephone circuits, phantom circuits, carrier current, the voice frequency side circuits of a pair of physical telephone lines, and the like.

To provide receivers in which the received signals may directly, or after suitable amplification may directly, produce a recording immediately legible without the necessity of photographic development or use of chemically prepared materials.

To provide receivers, in which the speed may be regulated independently of any mechanical or electrical control derived from the speed of the sender.

To provide receivers that will respond to any alternating current frequency within a median band of the voice frequency range.

To provide a system in which the observed results of reception constitute the operator's guide to readjustment of the speed of the receiver when required.

To provide a system in which the speed of the receiving printer is adjustable within the judgment of the receiving operator.

To provide receiving recorders that will produce a plurality of simultaneous records which are essentially duplicates, one of which will be complete and the others of which may be fractional and may be disregarded.

To provide novel alternate forms of senders which may be substituted in our improved complete operating system.

To provide a simplified receiver utilizing direct mechanical recording from the armature of a polarized magnet.

To provide a simplified system for transmission of intelligence by radiant energy.

To provide novel receiving and transmitting mechanisms for association in any of the general systems of communication herein disclosed, the transmitter embodying means for scanning a printed message by a light ray, and the receiver embodying means to convert the received signal impulses into light rays for direct reproducing of the transmitted message on sensitized paper, or photographic film, or by chemical means.

To provide modifications of our invention directly applicable for transmission over a line conductor available exclusively for the use of our improved telegraph systems.

To provide a simple system of adjusting the relative values of all of the speeds of the mechanisms utilized in the systems; namely, the speed of travel of the sending tape, the speed of travel of a scanning ray over the surface of the tape, and the frequency of the alternating currents of propagation, utilized by deriving all of the speeds from a single source of governed speed.

To associate a flashing lamp with a thermionic valve in such manner that the operation of the valve will flash the lamp to record the signals photochemically.

To transmit signals manually for emergency service and to record the manual signals without changing or readjusting the receiver.

To provide novel and simplified methods of generating voice frequency transmission currents.

Further objects of our invention will appear from the following detailed description of the preferred embodiments thereof, and are defined by the scope of the appended claims.

In the figures which accompany and form a part of this specification, like characters indicate like parts throughout the several views.

Figure 1 is a diagrammatic showing of line and local circuits with mechanism indicated for our preferred embodiment, comprising sending, receiving, repeating, and switching stations and manual reversing switches for changing the direction of telegraphic transmission, or alternatively for telephonic transmission.

Figure 2 shows a schematic arrangement of the essential mechanical parts of a tape-controlled sender utilized in a preferred embodiment.

Figure 2B is a broken elevation taken on line 2B—2B of Figure 2.

Figure 2C is a plan of the tape which controls the transmitter of Figure 2.

Figure 3 is a section of the permutation bars, selection bail, brush carriers and code discs of the mechanism of Figure 2, taken on line 3—3 of Figure 2.

Figure 4 shows a mechanical detail of the gearing interconnecting the apparatus of Figure 2.

Figure 5 shows detail of motor and governor for driving the power shaft of the mechanism of Figure 2 and other mechanism of the system at a determined regulated speed.

Figure 5B shows a detail of the governor of Figure 5.

Figure 6 shows a diagrammatic perspective of the essential elements of a preferred form of receiver.

Figure 7 is a section of the apparatus of Figure 6 taken substantially centrally thereof with the field magnet in elevation.

Figure 7B is an enlarged detail of the armature member of Figure 7.

Figure 8 is a diagram of the printing elements of the receiver of Figure 6, showing the record tape, printing armature member and a development of the printing edges of the printing wheel.

Figure 9 shows a normal record tape made in accordance with this invention.

Figure 10 shows a record tape in which the power shaft at the receiving station was running slightly above the most desirable speed.

Figure 11 shows a record tape in which the power shaft at the receiving station was running slightly below the most desirable speed.

Figure 12 is a diagrammatic perspective of details of motor and governor and speed regulating gear for driving receivers utilized in this invention.

Figure 12B shows a view of a mechanical detail for orientation which may be added to the assembly of Figure 12.

Figure 13 is a schematic circuit diagram of a simplification of our system disclosed in Figure 1, in which a direct continuous line conductor permits some simplification of the telegraphic apparatus.

Figure 14 shows a two-way system embodying this invention in which telegraphic service may be had in opposite directions at the same time.

Figure 15 shows the circuit arrangements at a station for sending by radiant energy with modulated continuous wave, using the sender of Figure 2.

Figure 16 shows the circuit arrangements at a station for receiving transmission by radiant energy, for amplifying and rectifying the received signals, and for applying them to a receiver of the type of Figure 6.

Figure 16B shows a record tape produced at the receiver in response to operation of the manual telegraph key at the sender when sending Morse or Continental codes.

Figure 17 shows more or less diagrammatically modifications in the synchronous system of Figure 1 to utilize corrected starting, in which the receiver is started so that the first character of the record is controlled in its position upon the record tape and in which aberration of subsequent characters from that controlled position is limited.

Figure 18 is a fragmental end view of Figure 17.

Figure 19 shows the corrected tape as produced by the synchronous system and corrective start of the modification disclosed in Figures 17 and 18.

Figure 20 shows details of a modified receiver adapted to operate in cooperation with the sender of the left portion of Figure 17, and adapted when thus operated to produce a start-stop receiving action in which every character is placed in a corrected position upon the record tape.

Figure 21 shows a detailed modification of the receiver of Figure 20 by which the printed record upon the tape is restricted to a median line thereof.

Figure 22 shows a specimen of record tape as produced by a receiver embodying the modification shown in Figure 21.

Figure 23 is a side view of a code disc which forms a part of the sender of Figure 2, shown also in Figure 3 and in other figures.

Figure 24 is a diagram showing the analysis of a character according to the method for pre-scanning, the character shown being the character transmitted by the specific code disc shown in Figure 23.

Figure 25 illustrates a sending station in which a pre-printed message is scanned by light rays.

Figure 26 shows a receiving station in which the record is made by photographic means.

Figure 27 shows a sending station in which a keyboard operated mechanism controls stencils to position them selectively in the path of light rays which when projected through the stencil are scanned by a start-stop transmitting device.

Figure 28 shows mechanical details of a receiving station using start-stop control in which a polar line magnet is included directly in the line circuit without any associated amplifying devices.

Figure 29 is an enlarged view of the polar line magnet of Figure 28.

Figure 30 shows a keyboard sender with code discs in which the scanning may be of rectilinear or arcuate design.

Figure 31 is an enlarged view of the code discs and details of the multiple friction clutches therefor utilized with the sender shown in Figure 30.

Figure 32 discloses details of the electrical circuit contact elements of the device of Figure 30, taken on line 32—32 of Figure 31 with single-current working.

Figure 33 shows an alternative electrical sending circuit for the sender of Figure 30, with double-current working in the line conductors.

Figure 34 shows a direct-keyed oscillator for sending the code signals of this improved system by radiant energy.

Figure 35 is a system illustrating the adaptation of our invention to present duplex telegraph practice.

Figure 36 shows one adaptation of our invention to a simple differential two-way transmission system.

Figure 37 shows an adaptation of our invention to a Wheatstone bridge duplex or two-way system.

The description of the construction and arrangement of the mechanism and circuits of the system of Figures 1 to 12, 23 and 24 will proceed beginning with the sending station and proceeding through the line to the final receiving station, considering first the preferred form of the invention as shown diagrammatically in Figure 1.

*Transmitting apparatus*

Referring to Figure 5, at the sending station the power mains 10 and 11 are connected to prime mover 12 which operates drive shaft 13, and supplies operating power to the transmitting mechanism.

Power mains 10 and 11 are connected directly to field winding 14 of motor 12 and are connected to armature 15 in series with regulating resistance 16. Resistance 16 normally is shunted by contacts 17 and 18 of the centrifugal governor. This shunt circuit comprises wire 19, brush 20, contact ring 21, wire 22, contact 18, contact 17 of centrifugal arm 23 pivoted at 24, wire 25, contact ring 26, brush 27 and wire 28. From Figure 5, it will be seen that the contact rings 21 and 26 and the centrifugal governing mechanism carried thereby are driven by the motor 12.

Spring 29 is attached to centrifugal arm 23 and to screw 30 which passes through frame 31 and is adjustable by knurled nut 32. Should the speed of motor 12 reach a point where the centrifugal force of arm 23 is greater than tension of spring 29, arm 23 will open contacts 17 and 18, thus including resistance 16 in series with armature 14 of the motor and reducing the speed of the motor.

Referring to Figure 4, shaft 13 carries a pinion 51 which meshes with gear 52 on power shaft 53 of the sender of Figure 2. Shaft 53 carries spiral gear 54 which meshes spiral gear 55 on shaft 56 and thus drives transverse shaft 56 of the sender of Figure 2. Gears 54 and 55 are so related that the angular speed of shaft 56 is the same as the angular speed of shaft 53.

Referring to Figure 2, power shaft 53 carries three cams. The first cam, 61, controls the action of feelers 62, of which there are six in the device as shown in Figures 2 and 3, feelers 62 being sufficient in number to detect all of the holes in control tape 63. Tape 63 may be of any of the well known forms commonly in use in automatic telegraphy. The system as here described is adapted to use a six-hole cross-perforated tape, although the device may be arranged to be controlled from other forms of tape. Cam 61 engages cam follower roller 66 on cam follower 67 pivoted at 68 to the sender frame, not shown. Cam follower 67 is under tension of spring 70 and has extension arm 69 and transverse flange 71 which engages six lugs 72 on six feelers 62. Each feeler 62 is provided with individual spring 73 urging it upward, a tape-testing pin 74 and stop lug 75. Springs 73 extend to the sender frame at 76 and the six feelers operate freely in slide guides 77 and 78 fixed in the frame. Tape guide 80 is perforated at 81 opposite each tape-testing pin 74.

Follower 67 carries pawl 85 attached pivotally at 86 to arm 69 thereof, and under tension of spring 87 which draws the pawl against the teeth of ratchet 90. Ratchet 90 and tape feed wheel 91 are fixed to shaft 92 which is journaled in the frame. Pins on feed wheel 91 engage feed holes in tape 63 in well known manner to feed the tape in operation.

Follower 67 has a stop tooth 96 engaged by tooth 97 in manual control lever 98 pivoted at 99 to the frame of the sender. In operation, with lever 98 in the full line position shown, follower 67 is held from movement as cam 61 rotates and operation of the transmitter is prevented. With lever 98 moved to the dotted line position shown, follower 67 is freed for movement under influence of cam 61 and transmitting operations may proceed under control of tape 63.

Second cam 101 driven by shaft 53 controls the action of transfer feelers 102 which are equal in number to the tape-feelers 62 and are controlled thereby. Cam 101 engages the cam-follower roller 106 on cam follower 107 pivoted at 108 to the frame. Cam follower 107 is provided with extension arm 109 and transverse flange 110 which engages a lug 112 on each of the six transfer feelers 102. Each feeler is provided with individual spring 113, testing finger 114 and power lug 115. Springs 113 are secured to the sender frame at 116 and the six transfer feelers are pivotally mounted independently upon common pivat shaft 117 fixed to the frame. Cam follower 107 is under tension of spring 119 secured to the frame at 120.

The third cam 121 driven by shaft 53 is provided with actuating projection 121a which controls the action of selector bail 122. Cam 121 engages cam-follower roller 126 on cam follower arm 127 formed integrally with bail 122. Bail 122 is under tension of two springs, spring 129 secured to the frame at 130, and spring 131 secured to the frame at 132. Bail 122 operates freely in a longitudinal and vertical direction in slide guides 134, 135 and 136 fixed in the sender frame. Guides 134 and 135 are provided with inclined cam surface 134a and 135a which are engaged by surfaces 134b and 135b respectively of bail 122. As cam 121 rotates the cooperation of projection 121a, surfaces 134a, 134b, 135a and 135b and springs 129 and 131 shifts bail 122 suddenly to and from the dotted line position indicated once for each revolution of shaft 53.

Six permutation bars 150 (Figures 2 and 3) provided with selecting notches 151 slide freely in guides 152 and 153 fixed to the sender frame.

Each bar 150 is provided with an individual spring 155 secured to the sender frame at 156. A bar 150 is individual to and controlled by each of the six transfer feelers 102, and springs 155 draw bars 150 severally against lugs 115 which determine the normal position of rest of the bars, the normal position of feelers 102 and projections 115 being determined by flange 110 of follower 107 whose position is determined by engagement of roller 106 and cam 101.

Each bar 150 has a locking notch 157 adapted to be engaged by nose 158 of latch 160 individual to each bar 150. Secured to each latch 160 is one end of a spring 161 secured to the sender frame at 162. The six latches 160 are pivotally mounted upon a common pivot 163 fixed in the frame, and are crossed by a striker pin 166 carried by restoring bellcrank 167 pivotally mounted at 168 upon the frame, and under tension of spring 169 secured to the frame at 170. Bellcrank 167 rotates upon its pivot 168 and extention 171 thereof at all times slidably engages end 172 of selector bail 122. Notches 151 of bars 150 are preferably arranged in a manner similar to the permutation code bars commonly used in type-printing telegraphs and are preferably arranged to operate under control of permutation code perforations in tape 63 as will more fully hereinafter appear.

Referring to Figure 3 in connection with Figure 2, a series of bellcranks 190, one for each character to be transmitted are pivotally mounted upon common pivot shaft 191. Each bellcrank 190 has an individual spring 192 secured to the frame at 193 which functions to urge arms 194 of cranks 190 into engagement with the six permutation bars 150 in a position to be selectively controlled by the selectively aligned notches 151 of bars 150 in accordance with the control perforations in tape 63 as will more fully hereinafter appear.

Each bellcrank 190 carries insulation strips 196 and screws 197 which clamp a brush 200 in position. Brushes 200 contact with code discs 201, one for each character or signal to be transmitted which are rigidly secured to shaft 56, and spaced from each other by collars 205. Each code disc 201 has associated with it an individual brush 200 with its operating member 190.

All the brushes 200 are connected to common wire 209 and code discs 201 are connected electrically through shaft 56 and through the sender frame to common wire 210. Wires 209 and 210 form a part of the output circuit of the sender as will be disclosed in the description of Figure 1. Each code disc has a high radius or contact surface 211 at each point where a signal is to be transmitted. Contact surfaces 211 are arranged on each code disc in such manner as to transmit the desired signals.

Code discs 201 are designed according to our novel method of prescanning in which characters or symbols to be sent are divided into any desirable number of sending units of area. The several unit areas thus created are assigned in order of scanning to the periphery of the disc 201, the dark areas of the signal or message unit being the high surfaces 211 to engage the brush 200 to send a signal, although it is obvious that the light areas might be made the high surfaces, depending upon the method of transmission adopted.

By the term mechanical prescanning is meant the analysis of a character into signals suitable for transmission and comparable to the scanning of the character according to a determined method, then the production of a mechanical member containing elements corresponding directly and individually to the said signals and ignoring all resemblance to the mechanical form of the character represented, then the transmission of signals under direct control of said mechanical member. This may be accomplished in many ways.

By way of example, prescanning of the letter "R" together with the area of space between the letter and the preceding letter is shown in Figures 23 and 24. The total area of the letter and space is divided into 450 unit areas arranged in eighteen vertical strips of twenty-five units each. As shown in Figure 23 the eighteen strips are laid off in eighteen equal angular sectors on the code disc and each angular sector is divided into twenty-five angular units each corresponding to a unit area of the corresponding vertical strip. Code disc periphery is then laid off by recessing of the corresponding disc unit sections of each sector where the respective unit areas are light, and where the units are dark raised surfaces 211 are provided. It is generally desirable to leave a vertical space between letters when two or more letters are printed in vertical rows, as hereinafter described in detail. To accomplish this, a blank interval is left below and/or above each letter or character, shown in Figure 24 as three lower horizontal blank rows. This prescanning or generation of the code disc periphery in the example given begins at unit area 231 (white) in Figure 24, and progresses vertically to area 232. Since all of the unit areas in this strip are white, the twenty-five units of the first sector between points 231a and 232a of Figure 23 are recessed. Prescanning then proceeds for the next sector beginning with unit area 233 and ending with unit 234 of the second vertical strip, and with points 233a and 234a on the code disc periphery of Figure 23. All areas of the second strip being white, the second sector of the code disc is also recessed. Prescanning then begins for the third sector at area 235 and ends at area 236 of Figure 24, resulting in the third recessed sector from 235a to 236a, and completing seventy-five successive white unit areas giving recessed sector 256, Figure 23. Prescanning continues from unit area 237 to unit area 238, then 239 to 240, and 241 to 242 completing three groups of twenty-two black unit areas, each preceded by three white areas, resulting in corresponding raised portions 237a, 239a and 241a, each preceded by recessed sector 243 for the next three sectors as shown in Figure 23. Prescanning proceeds in like manner for the seventh sector, giving thirteen unit white areas for depressed arc section 254 of disc 201, then three black unit areas for first arc 211, six white unit areas corresponding to arc 255, and three black unit areas for final arc 211 of the seventh sector of disc 201. In this manner prescanning proceeds through the remaining eleven strips of Figure 24 to complete the periphery of the code disc 201 of Figures 23 and 3. Thus there may be produced an unidimensional mechanical record of a bi-dimensional character and under control of this lineal record there may be transmitted a series of telegraphic signals to produce a lineal record which may be assembled into bi-dimensional record to reproduce the character.

In like manner each different code disc is developed to transmit the other desired characters. Preferably every letter or character to be transmitted is preceded by the desired space between it and the preceding letter so that every code disc comprises a letter space and character, and the first three sectors of each disc are allotted to transmission of the space, thereby providing a depressed starting arc 256 extending from point 231a to point 236a of Figure 23 on each disc. The code discs are then fixed on shaft 56 in such manner that the starting arcs are in alignment.

Tape 63 may be perforated in any well known manner with successive rows of perforations 257 arranged in controlling combinations in accordance with a six unit permutation code, and with one or more rows of feed holes to be engaged by the pins on the tape feed wheel 91 of the transmitter.

As shown in Figure 2, for purposes of remote control, a magnetically controlled re-perforator 258 of well known construction controlled by signal selector magnet 259 is utilized. Selector magnet 259 is connected in control line 260 which is in turn controlled by a six unit permutation code tape transmitter 261 of any well known construction and which controls the transmission of code impulses to line 260 from battery 262 in accordance with perforations in control tape 263 formed in keyboard perforator 264 of any well known construction, located at the operator's position.

As the receiving perforator 258 duplicates the tape 263 adjacent the transmitting mechanism, it will be obvious to those skilled in the art that the keyboard perforator 264 and tape 263 may be utilized directly to control the sender in place of tape 63 if desired.

Operation of sender

In operation of the transmitting apparatus thus far described a plurality of discs 201 are arranged on the shaft 56, each disk having its periphery so arranged that it corresponds to a character or symbol to be transmitted. In Figures 23 and 24, the disc for the letter R is illustrated, it being understood that each letter of the alphabet and each other character to be transmitted will have a disc whose periphery has varying high and low portions thereon corresponding to the white and black areas of the letter to be represented, as if such letter were scanned.

The transmitting apparatus is started in operation by closing the circuit including power lines 11 to cause operation of prime mover 12 to continuously rotate shaft 13. The speed of prime mover 12 is accurately and locally governed by the centrifugal switch mechanism including short circuiting contacts 17 and 18.

Prime mover 12 rotates shaft 56 by gearing shown in Figure 4 whereby discs 201 are constantly rotated. Perforated tape 63 is passed through guide 89, the tape being perforated by perforator 258 shown in Figure 2, as operated from the transmitter 264, or the tape may be perforated directly at the sending station by a usual form of perforating machine. Due to the operation of the motor 12 shaft 53 is driven in a clockwise direction as seen in Figure 2. Gears 54 and 55 being of equal ratio, shaft 56 rotates at the same speed as shaft 53.

Cam follower 67 is held in non-operating position by manual lever 98 when transmission is suspended. At such time shafts 53 and 56 will be rotating at a speed suitable for transmission but the feeler fingers 62 will be locked in their off position due to the lock provided by manual lever 98.

In order to start transmission, manual lever 98 is lifted, thus releasing the cam follower 67. Notch 97 of lever 98 and detent 96 of follower 67 are so shaped, and the pivot points of the lever and follower are so positioned, that under the action of spring 70 raising of lever 98 is prevented until roller 66 is on the peak of cam 61, thereby preventing skipping of a character by initiation of transmission at a wrong point of the cycle. With cam 61 in the position shown in Figure 2, brushes 200 and discs 201 will be in the position shown in Figure 3, and cam roller 66 will be gradually lowered due to rotation of shaft 53 and cam 61, the lowering taking place through approximately 120° of angle of revolution of shaft 53. Rotation of cam 61 allows spring 70 to rotate cam follower 67 counterclockwise about its pivot 68 to lift flange 71 out of engagement with the six lugs 72 on tape feelers 62 which thus rise under influence of springs 73. In the embodiment of our invention as illustrated, a six unit cross perforated control tape is used, but it will be understood that any other form of tape may be used. When feelers 62 rise, should any feeler pin 74 register with a hole in tape 63, said pin will pass through this hole and its feeler finger 62 will rise to remove its stop lug 75 from the path of finger 114 on corresponding intermediate finger 102. Accordingly, fingers 62 will be positioned in various combinations in accordance with the controlling permutation code perforations, some of said fingers being raised, and some being held in their lowered position, dependent upon the character to be transmitted.

Rotation of shaft 53 for approximately 110° from the position shown in Figure 2 carries high portion 121a of cam 121 into engagement with roller 126 to shift follower 127 of the selection bail 122, thus moving said bail to the left and vertically, as seen in Figure 2, due to the sloping surfaces 134a and 134b, 135a and 135b. Vertical movement of the selection bail 122 causes it to engage arms 194 of bellcranks 190 to raise said members clear of permutation bars 150 to permit setting of the bars immediately after the last transmitting points of discs 201 have passed their respective brushes 200.

Movement to the left of Figure 2 of the bail 122 causes rotation of bellcrank 167 about its pivot 168 due to engagement of end 172 of the bail with portion 171 of said lever. Rotation of bellcrank lever 167 counterclockwise against tension of its spring 169 causes striker pin 166 carried thereby, to engage and to depress any latch 160 which may be in engagement with its permutation bar 150. This release of the permutation bars 150 allows them to return to their right hand position under action of their individual springs 155, the ends of such bars engaging projections 115 on transfer fingers 102.

Further rotation of shaft 53 to about 120° next causes the low portion of transfer cam 101 to engage under roller 106 thus allowing spring 119 to rotate cam follower 107 counterclockwise, lifting flange 110 out of engagement with lugs 112 to release the six transfer feelers 102. At this point in the cycle of operations feeler fingers 62 have assumed their selected position in accordance with the character to be transmitted, some of said fingers being raised and some retained in the position shown in Figure 2, and transfer fingers 102 will be positioned accordingly. The transfer fingers associated with the feeler fingers 62 which are raised due to perforations in tape 63 are free to rotate clockwise under influence of their individual springs 113 which maintain lugs 112 in engagement with flange 110. Others of said transfer fingers are retained in the position shown in Figure 2 due to engaging lugs 75 on feeler fingers 62 contacting with lugs 114 preventing rotation of the transfer fingers.

The transfer fingers assume a position in accordance with the character to be transmitted at or just after restoration of bars 150 and due to the engagement of lugs 115 of these transfer fingers with the ends of the permutation bars 150, said bars will be forced to assume a position in accordance with the new character to be transmitted, it being understood that springs 113 on the transfer fingers are stronger than springs 155 on permutation bars 150.

The code bars 150 engaged by the transfer fingers 102 which are free to rotate clockwise will be forced to the left, to thereby aline slots 151 with one bar 194 of bellcranks 190. Movement of permutation bars 150 to the left of Figure 2 alines notches 157 in said bars with ends 158 of latches 160. When shaft 53 has rotated to, say 140°, high portion 121a of cam 121 will clear roller 126, and selection bail 122 returns to its normal lowered position, under influence of its springs 129 and 131.

As bail 122 is lowered, latches 160 engage the notches of bars 150 and bellcrank 190 selected in accordance with the character to be transmitted, will fall into the alined notches of the code bars 150 and move the brush 200 thereon into engagement with one of the disks 201. It will be noted that low portion of cam 101 is of sufficient extent so transfer lever 107 and transfer fingers 102 will not be restored until after cam 121 allows bail 122 to be lowered and bars 150 are locked in their new position.

The selected brush 200 approaches its individual disc 201 at or immediately after the point marked "Start" in Figure 23, said disc rotating in the direction of the arrow shown in the above figure. The first three sectors of each disc 201 are non-contacting and transmit a character space. This space corresponds to the vertical areas designated by numerals 231 to 236 inclusive of Figure 24. As previously explained in connection with Figures 23 and 24, the contact of the selected brush 200 with its disc will transmit signals over the lines 209 and 210 in accordance with a scanning of the character to be transmitted as if the scanning were taking place at the transmitting station. However, due to novel prescanning of each character the actual transmission of signals takes place at a much greater speed than any scanning operation could transmit impulse signals, and therefore transmission is greatly expedited.

As the rotation of shaft 53 continues the selected character will be transmitted and transfer fingers 102 will be restored to the position shown in Figure 2 by the engagement of the high portion of cam 101 with roller 106 on the resetting arm 107. Further rotation of shaft 53 continues the transmission of the selected character and carries the high portion of cam 61 into engagement with roller 66 of lever 57 which restores feelers 62 to the lowered position by engagement of flange 71 with the shoulders 72 thereon, thus withdrawing the feeler fingers or pins 74 out of the holes in the tape 63. This clockwise rotation of follower 67 carries pawl 85 thereof downwardly engaging a tooth on the ratchet wheel 90 and stepping tape 63 forward to transmitting position for the next character, the parts being so arranged that feeler pins 74 are withdrawn from tape 63 prior to movement of the tape.

The transmitting mechanism is thus positioned for its next cycle of operation, beginning with raising of bail 122 when discs 201 reach the relative position shown to restore permutation bars 150 to their initial position by releasing latches 160 and also raising the lowered bellcrank 190.

It will be noted that a partial overlap of the transmission of a selected character and the setting of the tape and control feelers occurs, which is sufficient to permit continuous high speed transmission of the selected characters. This feature forms an important part of our invention.

*Composite telegraph and telephone transmission circuit*

Referring to Figure 1, one circuit arrangement utilizing the sending mechanism of Figures 2, 3, 4 and 23 so far described, and utilizing standard telephone switching apparatus and circuits, is disclosed. The shaft 56, brush 200, code disc 201 with its starting arc 256 and wires 209 and 210 and body conductor 212 illustrate in diagram the general arrangement of the sending mechanism of Figures 2, 3, 4 and 23.

Conductor 209 is connected through brush 200 to code disc 201 and body conductor 212, and thence through conductor 210, to voice frequency generator 270 and conductor 271 to the primary winding of transformer 273.

Secondary winding of transformer 273 is connected by conductors 276 to the left outer contacts 277 of manual control switch 278. Switch 278 is provided with two left tongues 279 and two right tongues 280, which in their normal positions engage respectively normal contacts 281 and 282, and when in their actuated positions engage respectively outer contacts 277 and 283. Plunger 284 actuates the tongues by spreading the two tongues of either pair when forced between their inner ends. Left normal contacts 281 are connected by wires 285 to right tongues 280 and right normal contacts 282 are connected by conductors 286 to complete telephone head set 287. Outer contacts 283 are connected by wires 288 to the primary winding of receiving transformers 290, the secondary winding of which is connected over wires 291 and 292 to receiving equipment of the character hereinafter described in connection with the receiving end of our improved system.

Tongues 279 are connected by subscriber's local line wires 298 to jack 299 in the local telephone switchboard 300, of any standard type. The switchboard equipment as shown comprises any number of jacks 299 connected to any desired number of subscriber's circuits in a manner that will be apparent to those skilled in the art, any desired number of operator's link circuits comprising battery 301, voice frequency repeating coil 302, switching plugs 303 and 304 forming a switching plug-pair or connecting link circuit which cooperates with any two switching jacks 299 and 305 to connect line 298 with line 311.

Any desired number of jacks may be provided, connected by line wires 311 to phantom induction coil 312 especially designed to pass currents of voice frequency in accordance with usual telephone practice.

Phantom induction coil 312 is connected at a median point to phantom circuit conductor 313 and further is connected by conductors 314 to composite set 315. Composite set 315 is connected to two telegraph line wires 316, and is further connected to local wires 318 and to long distance line wires or trunk lines 320. Local wires 318 extend to high pass filter 322 which is connected to carrier-current wires 323.

Long distance line wires 320 extend to repeating station 330 disclosed in detail in "Transmission Networks and Wave Filters" by T. E. Shea, published by D. Van Nostrand and Company, New York, 1929, and illustrated in Figure 3 thereof. At station 330 line 320 is connected to composite set 331. Composite set 331 is connected to the telegraph wires 332 and further is connected by wires 334 to high pass filter 335 and by wires 336 to low pass filter 337. High pass filter 335 is connected to carrier-current wires 338. Low pass filter 337 is connected by wires 340 to phantom induction coil 341, which is connected at a median point to phantom circuit wire 342 and further is connected by wires 343 to hybrid coil 350.

Within rectangle 351 at the repeating station the apparatus is organized and adjusted in a manner well known to those skilled in the art so that signals of voice frequency received by the hybrid coil 350 from the wires 343 are propagated over wires 352 but not over wires 353. Signals of voice frequency received by hybrid coil 350 from wires 353 are propagated over wires 353 but not over wires 352. Hybrid coil 350 is connected by wires 352 to thermionic amplifier 355, thence by wires 356 to low pass filter 357 and thence by wires 358 to hybrid coil 360. Within rectangle 351 the apparatus is so organized and adjusted that signals of voice frequency received by hybrid coil 360 from wires 358 are propagated over wires 361 but not over wires 362. Signals of voice frequency received by hybrid coil 360 from wires 361 are not propagated over the wires 358 but are propagated through wires 362, amplifier 363, wires 364, low pass filter 365 and wires 353 to hybrid coil 350. In this way it will be seen that an effective two-way repeating station is provided.

Hybrid coil 360 is connected by wires 361 to phantom induction coil 370, in turn connected to phantom circuit wire 371 and further by wires 372 to low pass filter 373. Low pass filter 373 is connected by wires 376 to high pass filter 377 and by wires 378 to composite set 379. High pass filter 377 is connected further to carrier-current wires 380. Composite set 379 is connected to telegraphic wires 382 and further to trunk line conductors 384 which lead out of repeating station 330 to high pass filter 388 and to composite set 389.

High pass filter 388 is connected further to carrier current wires 390. Composite set 389 is connected to telegraph wires 391 and further is connected by wires 393 to phantom induction coil 394.

Phantom induction coil 394 is connected to phantom-circuit wire 395 and further is connected by line wires 396 to jack 399 in telephone switchboard 400, similar to the switchboard 300.

As above pointed out, repeater 330 is illustrated by Figure 3 of the book "Transmission Networks and Wave Filters" by T. E. Shea, and by reference thereto the apparatus and circuits from 312 to 394 may be understood. It will be understood that as many such circuits as desired may interconnect the switchboards 300 and 400 or other similar switchboards, and that each board may serve any desired number of local subscribers' circuits as is usual in telephone practice.

The equipment of local telephone switching board 400 comprises battery 401, repeating coil 402 and switch plugs 403 and 404 forming a switch-plug pair or operator's link circuit which cooperates with any desired number of switching jacks 399 and 405. Repeating coil 402 is especially designed to pass currents of voice frequency.

Line wires 396 are connected to jack 399 which is connected by plug-pair to jack 405. Local or subscriber's line wires 416 connect jack 405 to left tongues 417 of manual switch 418. Switch 418 has two left tongues 417 and two right tongues 419, which in their normal positions engage respectively normal contacts 420 and 421, and in their shifted or actuated positions, engage respectively outer contacts 422 and 423. Plunger 424 actuates the tongues of either pair by spreading. Left normal contacts 420 are connected by wires 425 to right tongues 419 and right normal contacts 421 are connected by wires 426 to the complete subscriber's telephone set 427.

Left outer contacts 422 are connected by wires 428 to the sending induction coil or transformer 429. The secondary circuit from transformer 429 extends over the wires 430 to a complete sending set identical with the sending set associated with transformer 273.

Right outer contacts 423 of switch 418 are connected by wires 432 to receiving induction coil or transformer 433. At the receiving station one side of the secondary winding of transformer 433 is connected by wire 434 through biasing battery 435 to grid 436 of thermionic valve 437. The other side of transformer 433 is connected by wire 440 to filament 441 heated by battery 442 thus completing the connection for transfer of signals from line 432 to valve 437. Filament 441 is connected through wire 443, battery 444, resistance 445 and wire 446 to plate 447 forming a circuit for the output of signals from the valve 437.

Output of amplifying valve 437 is imposed upon amplifying valve 450 by means of conductor 448 connected to filament 451 heated by battery 452, and conductor 449 and biasing battery 453 to grid 454 of valve 450. Filament 451 is connected through wire 456, battery 457, transformer winding 458 of transformer 461 and wire 459 to plate 460.

Transformer 461 has primary winding 458 and two secondary windings 462 and 463 connected at point 464. Free end of winding 462 is connected through uni-directional valve or detector 465 to junction point 466. Free end of winding 463 is connected through uni-directional valve or detector 467 to junction point 466. Point 466 is connected through wire 469, and operating winding 470 of printer 471 and thence through the wire 472 to point 464.

*Transmission circuit operation*

The operation of the transmission circuit shown in Figure 1, will now be described. The subscriber desiring to transmit messages calls up his central station operator on his telephone set, giving the operator the number or code address of the called subscriber, who it will be assumed, is connected to a different exchange. The connection is then made by the operators through their link circuits to connect the calling and called subscribers as shown and in well known manner. Switches 278 and 418 are then shifted to the position for telegraphic communication, and operation of the sender by the calling subscriber is then initiated under control of a tape upon which the desired message is perforated.

Each interval of engagement between the selected brush 200 and its corresponding code disc 201 will close the local sending circuit from voice frequency generator 270 to sending induction coil 273. The signal is then propagated through wires 276, outer switch contacts 277, switch tongues 279, (plug 284 being in the full line position of Figure 1) local lines 298, switchboard 300, phantom coil 312, wires 314, composite set 315, long distance wires 320, and into repeating station 330. The signal then passes to composite set 331, wires 336, low pass filter 337, wires 340, phantom coil 341, wires 343 of coil 350, wires 352, amplifier 355, wires 356, low pass filter 357, wires 358, hybrid coil 360, wires 361, phantom coil 370, wires 372, low pass filter 373, wires 378, composite set 379, and thus out of the repeater station to long distance wires 384. The signal then passes to composite set 389, wires 393, phantom coil 394, local line wires 396, jack 399, plug 403, repeating coil 402, plug 404, jack 405, local line wires 416, switch tongues 417, switch normal contacts 420 (plug 424 being as shown in full lines in Figure 1), wires 425, operated switch tongues 419, outer contacts 423, local wires 432, receiving induction coil 433, and wires 434 and 440 to valve 437. Then the signal passes in amplified volume over wires 456 and 459 to induction coil 461, to the rectifying system comprising, as essential parts, the two unidirectional valves 465 and 467.

Windings 462 and 463 are so related to winding 458 of induction coil 461 that the alternating current of received signals tends to product a current flowing upward through both coils 462 and 463 and then flowing downward through both these coils. Thus current pulses flow upward from junction 464 through winding 462, and one-way valve 465 to junction 466, then through wire 469, operating coil 470, and wire 472 to junction 464. However, current does not flow upward through winding 463 because one-way valve 467 opposes the potential developed in winding 463 and thus stops current flow. Alternately with the pulses through valve 465, other current pulses flow downward through winding 463 and through valve 467 to junction 466 thence through wire 469, operating coil 470, and wire 472 to junction 464 but not downward through winding 462 due to one-way valve 465 which opposes potential developed in winding 462 and thus stops current flow. Both sets of signal pulses are therefore in the same direction through operating winding 470 of receiving station 471 and constitute the equivalent of a direct current for the duration of the signal pulse.

The received impulses are recorded at the called station on our improved receiving apparatus hereinafter described. After communication has ceased the operators remove the connecting plugs in their link circuits from the respective jacks in well known manner, and the circuits are cleared for other telegraphic or telephone communication. At the termination of intercommunication the calling and called subscribers shift switches 278 and 418 to connect their telephone sets into their circuits for operation.

It will be understood that our improved apparatus as disclosed may be utilized to transmit intelligence over the phantom circuit or channel described and by replacing the voice frequency generator with suitable direct current and carrier current generators may be utilized to transmit over the composite telegraph and carrier frequency circuits respectively, utilizing each channel of the transmission system disclosed simultaneously.

*Receiving mechanism*

The details of the receiving printing unit 471 of Fig. 1 are shown in Figures 6 to 12, and now will be described.

Referring to Figure 12, power mains 511 are connected to prime mover 512 which may turn shaft 513 bearing governor wheel 514.

Battery 515, magnet 516, wires 517, adjustment screw 518 with its contact 519 and the contact member 520 on arm 521 of the vibrator 522 form a self-interrupting energizing circuit for the magnet 516.

Battery 515, vibrator 522, arm 523, contact member 524, contact 525, adjustment screw 526, wire 527, magnet 528 and wire 529 form an energizing circuit for speed governing magnet 528. Pole pieces 530 are attached to magnet 528 and approach governor wheel 514 on opposite sides in such manner that two teeth 531 of the governor wheel may be under two pole pieces at the same time. Switch 532 closes the two circuits just traced.

Pole pieces 530 and magnet 528 are mounted upon plate 533 sleeved upon shaft 513 (see Fig. 12B). A pointer 534 on plate 533 is associated with a fixed scale 535, and lock screw 536 with knurled head serves to lock plate 533 in adjusted position. This arrangement permits angular adjustment of pole pieces 530 around shaft 513 to effect orientation of the receiver.

Adjacent the ends of vibrating arms 521 and 523 are pole pieces 540 and 541 of magnet 542 energized by a circuit including battery 543 and adjustable resistance 545.

By the mechanism as above described, the speed of prime mover 512 is accurately and locally governed by the magnetic brake mechanism as follows. With switch 532 closed, vibrator 522 will operate, it being necessary at times to manually start the same. After operation of vibrator 522 is initiated it will be continuously maintained by the magnetic drive make and break circuit. Periodic energization of magnet 528 magnetizes poles 530 which will automatically maintain the speed of prime mover 512 constant by action of pole pieces 530 on teeth 531 of wheel 514. If prime mover 512 tends to speed up faster than the rate of vibration of fork 522 the periodic energization of magnet 528 will operate to retard the motor, since teeth 531 on wheel 514 will be pulled into registry with pole pieces 530 each time magnet 528 is energized. The same result occurs if the motor 512 slows up in its operation behind vibrator 522, and in this way the speed of the receiving mechanism is very closely regulated by the vibrator or tuning fork 522.

If the speed of the receiver is not exactly in synchronism with that of the transmiting mechanism, as will be apparent from an inspection of the printed tape at the receiver, adjustment of rheostat contact 545 will vary the magnetic effect of poles 540 ano 541 on tines 521 and 523 to accelerate or retard vibration of the vibrator 522 to secure accurate synchronization.

Shaft 513 carries driving gear 550 which meshes gear 551 on shaft 552. Shaft 552 carries and drives pinion gear 553 and printing or recording wheel 554. Pinion 553 meshes with and drives gear 555 on the shaft 556 which shaft bears and drives feed roller 557.

Referring to Figures 6 and 7, feed roller 557 has a companion presser roller (558 in Fig. 12) suitably urged towards roller 557 and driven between the two rollers are two tapes 560 and 561. Tape 560 constitutes the record receiving surface and tape 561 is a pigment carrying tape such as carbon transfer paper or an ink ribbon of the type used in typewriters.

Printing wheel 554 is provided on its cylindrical surface with symmetrical spiral knife edges 565, which are normally substantially in contact with the tapes.

Under the tapes and opposite printing wheel 554 is the operating member or platen 566 having knife edge 567 arranged transversely at a slight angle with respect to the tapes as will more fully hereinafter appear. Member 566 is attached to an armature member 568 of cup form (see Fig. 7B) supported on a spring mounting 569 which carries the recorder operating winding 470. Receiver field magnet 575 has winding 577 and core 576 having extension poles 578 which terminate closely adjacent to and the ends of which partially encompass and fit closely around winding 470. Field winding 577 is connected to battery 580 and is normally energized.

In Figure 8, tapes 560 and 561 are shown as viewed from above in Figure 6, and diagonal lines 585 show a development of edges 565 of printing wheel 554. Dotted line 567 is the edge 567 of the recording platen of Figures 6 and 7, shown dotted because it is below the tapes 560 and 561. This line, it will be noted is at a slight angle from the normal or transverse line of the tape. At 586 are shown the printed lines which compose the ultimate record, as will appear in the description of the operation.

Receiver operation

In operation of the receiver so far described, wheel 554 is driven constantly at a proper recording speed as will more fully hereinafter appear, and received current impulses impressed upon the operating winding 470 are in such a direction as to move cup-shaped armature 568 carrying armature member 566 upwardly, by cooperation with the force of the field of magnet 575, marking signal current repels against field force of magnet 575 and winding 470 is propelled upward. In absence of marking signal current, mounting spring 569 draws edge 567 downward and relieves pressure from tape 560. In double current working (Fig. 35) a reverse-polarity spacing signal current cooperates with field force of magnet 575 to assist spring 569, or to obviate this spring.

From Figure 7 it will be noted that upward movement of armature member 566 causes engagement of knife edge 567 against the under surface of tape 560 pressing it with transfer paper 561 between edge 567 and spiral edges 565 on rotating receiver wheel 554.

From developed Figure 8 it will be seen that the spirals 565, represented in this figure by lines 585, are so arranged that two of the spirals intersect a line drawn perpendicular to the edge of the tape. Lines 585 which represent spiral edges 565 will have a motion over the tape 560 in the direction of the arrow 587, due to rotation of wheel 554, while tape 560 has a slower motion in the direction of arrow 590 due to turning of roller 557.

Should armature 566 be operated vertically by an incoming signal impulse when knife edge 567 is in the relative position shown in dotted lines in Figure 8, two dots will be printed upon the tape 560 at the two points where said knife edge 567 intersects spiral edges 585, or at points 567a, 567b. Should this vertical movement of knife edge 567 be repeated a brief interval later, a pair of dots will again be printed, but above the first pair of dots 567a and 567b because of the intervening movement of the tape and of spiral edges 585. If a letter is to be transmitted having a long vertical portion, such as the letter B, the knife edge 567 will be held in raised position by a comparatively long signal when the line is to be recorded so that each spiral line 585 will move to the right of Figure 8 a distance such that any intersecting point will in effect, move vertically half the width of the tape. If an incoming signal is received when the edge 567 occupied the position shown dotted in Figure 8, a vertical line will be marked on the tape 560 from 567a nearly to 567b, due to the movement to the right of spiral edge 585 contacting continuously with 567. A vertical line will also be drawn from 567b to the top of the wheel 554 and from the bottom of wheel 554 almost up to 567a, as seen in the letter R at the left side of the tape. Owing to the comparatively slow but continuous motion of the tape 560 the lines printed thereupon do not coincide exactly with the edge 567 but are normal to the edge of the tape or in the direction of lines 586 of Figure 8.

The vertical line so recorded on the tape will correspond to black unit areas extending from point 237 to point 238 of Figure 24, and will be transmitted by engagement of one of the brushes 200 with portion 237a of the R disc (Figure 23). Further movement of the R disc at the transmitter will result in non-contacting relation of the brush corresponding to low portion 243, then contact with high portion 239a, then non-contact with low portion 243, then contact with high portion 241a, then non-contact with low segment 254 in Figure 23 and the successive contacting for the two high portions 211 spaced by the non-contacting segment 255. These long lines recorded from high portions 237a, 239a and 241a unit upon record tape 560 to form the stem portion of letter R being recorded. The two smaller contacting portions 211 will result in four dashes or lines adjacent the vertical lines on the tape 560 which will thus begin the horizontal portions of the letter R as seen in Figure 24, it being understood that the equivalent of two R's is being printed. Continued rotation of the R disc will transmit signalling impulses spaced by proper blank signals to develop the letter R in one complete and two fractional characters on the tape 560. In the same manner each character to be transmitted is developed by successive impulses received from the selective code discs upon the coil 470 of the receiving instrument.

Should knife edge 567 be held upwardly for a long period of time, for example, while one of the spiral lines 585 passes completely over the knife edge 567, successive vertical lines would be printed upon the tape 560 by the passage of successive edges 585 of the printing wheel and would produce substantially a solid printing upon the tape.

Since a continuous transmitted current or marking condition would produce a succession of these vertical black lines which would thus blacken the entire surface of the record tape, and since the omission of a current or transmission marking will leave a blank space or light areas, legible records may be produced by omitting the proper combinations of marking signals. The combinations of marking and spacing conditions necessary for each character to be transmitted are controlled by a code disc 201 individual thereto, the proper code disc being selected by selection of its brush 200 under control of the transmitting tape.

Spacing between letters, as previously explained, is produced by the initial omission of current or transmission of a spacing signal preceding each character transmitted.

As previously stated, due to the overlap of the spiral knife edges 565, a double record will be produced on tape 560 as shown in tape 591 of Figure 9. It will be clearly understood that a receiver to reproduce three or more lines of characters may be attained by providing spiral knife edges 565 so that a larger number of these edges overlap at all points and a proper adjustment of speed of wheel 554.

Duplicate records may also be secured by providing a plurality of tapes 560 each having a transfer or carbon paper 561 superimposed one upon the other in a manner well known in the typewriting or telegraph art.

Synchronization

The improved duplicate record recorder permits wide variations in receiver and transmitter speeds without loss of signals and permits the use of novel methods of speed control for practical operation without the necessity for special control or synchronizing signals or devices. This is due to the fact that at least one complete character is always received and the position of the characters on the receiving record indicates the synchronous or asynchronous condition of the apparatus and an operator can, without interruption of signalling, visually note deviations of the receiver from synchronism, and can adjust the receiver speeds without loss of signals.

If the speed and phase of rotation of printing wheel 554 correspond exactly to the speed of rotation and phase of the transmitting code discs, the record will be received as shown upon tape 591 of Figure 9, as one complete set of characters uniformly spaced from the edges of the receiving tape and two fractional rows. Should the speed of wheel 554 be faster than that of code discs of the transmitting instrument, the record will be received as shown on the tape 592 of Figure 10. If the speed of the receiver is slower than the transmitter the resultant record will be as shown upon the tape 593 (Figure 11). A continuance of the effect shown in Figure 11 would carry the median row of characters to the lower edge of the record tape where the reader would then cease to read one line of characters and would begin to read the next vertical line thereof.

The most important feature of the two letter method of recording is the elimination of all control between the sender and receiver. This is very desirable in radio transmission since foreign impulses such as static cannot interfere with the proper and legible placing of the letter on the record tape. Should the effect repeat itself persistently the speed of the vibrator at the receiving station may be manually adjusted to restore the receiver as closely as desired to synchronous speed by movement of the rheostat 545, as described in connection with Figure 12, during reception and without loss of signals.

System operation

The printing operations of this improved system as shown in Figures 1 to 12 will now be understood from the description of operation of the sending instrument, the complete system, and the receiver as given. It will be understood of course, that the novel sender and/or receiver may be associated with various other systems for transmitting other signal impulses than that shown in Figure 1.

Emergency telegraph transmission may be carried out by operation of manual key 268 of Figure 15, which will substitute marking pulses through the wires 267 and 269 instead of marking pulses through the brush 200 and code disc 201. The record of such manual sending will appear as shown on the tape of Figure 16B. Morse or Continental code signals may be recorded on the improved receiver in this way.

Not only does this improved system of telegraphy facilitate the transmission of intelligence over telephone channels adapted primarily for voice frequencies, but it cooperates fully with the modern systems of automatic printing telegraphs, both synchronous multiplex and start-stop, in which a permutation code such as the Baudot code, is used. The sender shown in Figure 2 is controlled by perforated tape 63 which is perforated according to a permutation code. This tape may be perforated by the reperforator 258 under control of telegraphic signals in permutation code over line wire 260 from sender 261 of any type operating under control of tape 263 perforated by keyboard perforator 264. Or a keyboard perforator such as 264 of any desired mechanical design may be operated on the site of the sender of Fig. 2 to produce directly the code tape 63.

The transmission signals according to our system as above described are propagated as transverse currents over side circuits 320 and 384 of Figure 1. At the same time, a telephone conversation may be propagated over the phantom circuit comprising in part wires 313, 342, 371 and 395, also four slow automatic or manual Morse channels over duplex wires 316, 332, 382 and 391; also, three carrier-current telephone conversations over wires 323, 338, 380 and 390. Wires 338 and 380 may be connected through an amplifying repeater and wires 332, and 382 may be connected through duplex telegraph repeaters as shown in Shea's book cited above.

Our system will not interfere with any of these customary uses of the telephone wires 320 and 384.

It is obvious that the transmission of line signals according to our system may be propagated over side circuits 320 and 384 or over the phantom circuits or over the carrier-current circuits with equal facility.

Equipment for transmission in either direction alternatively is shown in Figure 1. With manual switches 278 at the left station and 418 at the right station adjusted as shown, the transmission is from the left-hand station and to the right-hand station.

With switch plunger 284 shifted into its dotted line position to spread tongues 286, tongues 279 are released to engage their normal contacts 281 while tongues 280 engage their outer contacts 283. Local line 298 thus is disconnected from sending induction coil 273 and is connected instead through tongues 279, normal contacts 281, wires 285, tongues 280, outer contacts 283, and wires 288 to receiving induction coil 290 which symbolizes a complete receiving set as shown in detail in Figures 6 to 12.

With switch plunger 424 shifted into its dotted line position to spread tongues 417, tongues 419 are released to engage their normal contacts 421 while tongues 417 engage their outer contacts 422. Local line 416 thus is disconnected from receiving induction coil 433 and is connected instead through tongues 417, outer contacts 422 and wires 428 to sending induction coil 429 which symbolizes a complete sending set as shown in detail in Figures 2 to 5.

Transmission now may proceed from the right-hand station to the left-hand station. Repeating and amplifying item 351 will operate in both directions.

Should it be desired to communicate by telephone, plungers 284 and 424 of the two switches 278 and 418 are placed in their median positions. This permits all of the switch tongues 279, 280, 417 and 419 to engage their normal contacts 281, 282, 420 and 421. Local line 298 now is connected through switch tongues 279, normal contacts 281, wires 285, switch tongues 280, normal contacts 282 and wires 286 to complete telephone set 287. Local line 416 now is connected through switch tongues 417, normal contacts 420, wires 425, switch tongues 419, normal contacts 421, and wires 426 to complete telephone set 427. A telephonic communication thus is set up from telephone set 287 to local line 298 and thence over the path already traced in detail to local line 416 and to telephone set 427. This arrangement of our system permits a telephone conversation between the two stations shown, over any telephone circuit, to be confirmed by a printed telegram sent by either to the other or by both by the novel transmitter and receiver, before releasing the telephone circuit.

The two stations of Figure 1 may be connected over a commercial channel of telephone communication as shown or may be connected over a direct line conductor. In the latter case, for short distances, direct current transmission is preferable because simpler and requiring less apparatus.

*Direct current transmission*

For direct current transmission as shown in Figure 13, two identical stations, 600 and 601, are provided, each having the equipment of a sender 602 and receiver 471, switch 278 or 418 and telephone set 287 or 427 all as disclosed in connection with Figure 1.

Each sender 602 is connected to a source 603 of direct current and is connected by wires 605 to the outer contacts 277 and 422 of the manual switches 278 and 418. Operating coil 470 of each receiver is connected by wires 608 to the outer contacts 283 and 423 of the switches 278 and 418. Tongues 279 of station 600 are connected directly to tongues 417 of station 601 by line wires 610. Other connections of switches 278 and 418 are identical with Figure 1.

The sending circuit may be traced from source 603 and sender 602 of station 600, wires 605, contacts 277, tongues 279, line wires 610, tongues 417, normal contacts and wires of switch 418, tongues 423, wires 608 and operating winding 470 of the receiver 471 of station 601.

In operation direct-current source 603 gives signal currents controlled by sender 602 which are attenuated by line 610 but are suitable to operate the receiver 471 when they reach the station 601. Transmission in reverse direction or alternatively by telephone, is attained by adjusting the switches 278 and 418 as described in connection with Figure 1.

It will be seen that the system of our invention is admirably adapted for signal propagation by alternating currents, but it may also be adapted to direct current transmission. When utilizing alternating currents, it should not be confused with alternating-current systems in which each pulse of current constitutes a signal, nor with alternating-current systems in which signalling is achieved by the method of reversing single pulses of current. Such systems are characterized in that the fundamental frequency of the alternating current is too low for transmission over a voice circuit, being far below the frequencies of minimum attenuation of a voice-frequency channel of communication, even though in some cases such systems may be within the nominal mathematical range of audibility. The adaptation of these signals to the range of minimum attenuation of the commercially available voice propagation channels of communication is an important development over the prior art, and over any prior systems which superficially may appear similar.

*Radiant energy transmission*

In the forms of our invention as thus far described, transmission has been described over telephone, telegraph, carrier-current and phantom circuits. One of the most important channels of communication today is by radio and our invention is especially well adapted for radio communication.

Prior attempts to operate printing systems over radio channels have been largely unsuccessful, due principally to interference, static and fading, resulting in incorrect operation of the mechanically selected printing elements. Our novel system avoids this difficulty completely since a static charge will merely print one dot on the receiver tape and momentary fading will result in a light area. Such disturbances do not materially affect the legibility of the record received on our improved printer. These advantages, coupled with the simplicity, lack of necessity for synchronous operation, and the high speeds of operation attainable, are of particular importance in the field of radio communication.

Our novel system and apparatus is capable of efficient and accurate operation to transmit communication at speeds far in excess of the most modern permutation code telegraph printers. The highest speed attainable with present machines ranges from sixty to eighty words a minute whereas our system is capable of operation at two hundred words a minute and upward without sacrificing accuracy.

Referring to Figs. 15 and 16, one system is shown for radio communication, Fig. 15 disclosing a system for transmission by a modulated continuous wave.

The complete sender 602 has its code discs 201 connected through wire 671 and battery 672 to grid 673 of thermionic valve 674. Brushes 200 are connected through battery 675, wire 676 and wire 677 to filament 678 of thermionic valve 674 heated by battery 679. Battery 672 has its negative pole connected to grid 673. Battery 675 has its negative pole connected to filament 678. Resistance 680 is connected from filament 678 to wire 671 and to positive pole of battery 672.

Filament 678 is connected through wire 677 and wire 681 to filament 682 of thermionic valve 683, filament 682 being heated by battery 684. Plate 685 of valve 674 is connected through wire 686, inductive resistance 687 and wire 688 to the plate 689 of valve 683. Wire 681 is connected through battery 690 and non-inductive resistance 691 to wire 686.

Plate 689 of valve 683 is connected through wire 688 and wire 695 to the variable point 696 on inductive winding 697. Filament 682 is connected through wire 698 and condenser 699 to the variable point 700 on winding 697. Grid 701 of valve 683 is connected through wire 702, condenser 703 and wire 704 to the terminal 705 of winding 697. Wire 698 is connected through non-inductive resistance 706 and inductive resistance 707 to wire 702. Wire 698 is connected also through condenser 708 to wire 704.

Winding 697 is associated inductively with winding 709 which is connected at one end to earth at 710 and at the other end to antenna 711.

In Figure 16 antenna 721 is connected to winding 722 which is connected to earth at 723. Winding 722 is inductively associated with winding 724 which is connected at one end through wire 725 and battery 726 to grid 727 of thermionic valve 728. Winding 724 is further connected at its other end through wire 729 to filament 730 heated by battery 731. Wire 729 is connected through adjustable condenser 732 to adjustable point 733 on winding 724.

Plate 734 of valve 728 is connected through wire 735 and battery 736A to grid 737 of the thermionic valve 738. Filament 730 of valve 728 is further connected through wire 736, wire 739 to filament 740 of valve 738, filament 740 being heated by battery 741. Wire 739 is connected through battery 742 and resistance 743 to wire 735.

Filament 740 is connected through wire 744, battery 745, winding 458 and wire 746 to plate 747 in the valve 738.

For details of the connections between winding 458 and the complete receiver 471, see description of Figure 1, above The operation of the system of Figures 15 and 16, briefly traversed is as follows: Oscillator 683 produces continuous radiant energy upon antenna 711 and this radiant energy is varied in intensity by the sender 602 acting through the modulator 674.

Radiant energy received upon antenna 721 is amplified by valves 728 and 738 and is applied to receiver 471 as in Figure 1.

The operation of the system of Figures 15 and 16 in detail is as follows:

Current flows from battery 690 through wire 681, filament 682, plate 689, wire 688, resistance 687 and resistance 691 to battery 690. From this primary circuit, there is the derived circuit from filament 682 through wire 698, condenser 699, adjustable point 700, winding 697, adjustable point 696, wire 695 and wire 688 to plate 689. From this derived circuit there are two derived circuits around condenser 699, the first from 699 through non-inductive resistance 706, inductive resistance 707, wire 702, condenser 703, wire 704, upper winding 697, and adjustable contact 700, and the second from 699 through condenser 708, wire 704, upper winding 697, and adjustable contact 700.

Wire 702, forming a part of one of the derived circuits, is connected further to grid 701 of valve 683. Grid 701 thus acquires from plate 689 a potential which interrupts the current which gave the potential to the grid, which interruption removes from the grid the potential which caused the interruption and thus permits the current to flow again to repeat the cycle. A condition of oscillation thus is established, and a suitable current for radiation is transferred through inductively related windings 697 and 709 to antenna 711.

Normal polarization for grid 673 of valve 674 is obtained from filament 678 through resistance 680, wire 671 and battery 672 to grid 673, resulting in a negative potential upon the grid. A derived circuit around resistance 680 includes the wire 677, wire 676, battery 675, brush 200, and disc 201. When disc 201 engages brush 200, the higher potential of battery 675 is combined with the lower potential of battery 672, resulting in a positive potential upon grid 673 and permitting current to flow over the plate circuit of valve 674, from battery 690 through wire 681, wire 677, filament 678, plate 685, wire 686 and resistance 691. The circuit just traced is a derived circuit upon the primary circuit of energy for radiation, and the changes in this plate circuit of valve 674 caused by the code action of disc 201 and brush 200 will cause changes in the volume of radiant energy transferred to the antenna 711, thus modulating the radiated energy as desired in code conditions.

Energy radiated from the antenna 711 of Figure 15 is received by the antenna 721 of Figure 16 and is passed through winding 722, being transferred to winding 724 by the inductive relation of the two windings. Adjustable point 733 and adjustable condenser 732, or such other tuning devices as may be provided, permit adjustment of windings 722 and 724 to facilitate to the highest degree the reception of radiant energy by winding 722 and transfer of the received energy to winding 724.

Normal polarization for grid 727 of valve 728 is obtained from filament 730, through wire 729, winding 724, wire 725 and battery 726 to grid 727. This polarization is varied by the variations in the received radiant energy in winding 724, resulting in a varying current in the plate circuit from battery 742 through wire 736, filament 730, plate 734 and resistance 743. The effect is an amplification of the received signals.

Normal polarization for grid 737 of valve 738 is obtained over the path from filament 740 through wire 739, battery 742, resistance 743, wire 735, and battery 736A to grid 737. The batteries are adjusted to give the desired potential upon grid 737. This grid circuit for valve 738 is a derived circuit upon the plate circuit of valve 728 and the code variations in the plate circuit of valve 728, therefore, produce similar code variations in polarization of grid 737 of valve 738 which in turn produce variations in current of the plate circuit of valve 738, from battery 745 through wire 744, filament 740, plate 747, wire 746 and winding 458. The effect is a further amplification of the received signals and the propagation of the signals as alternating current of radiant frequency into the winding 458.

The further propagation of the signals to effect the operation of the printer 471 is as described in connection with Figure 1.

*Corrected starting*

To secure the starting reception and maintaining of each message with one line of received characters in the middle of the tape, as shown in Figure 9, we provide the controlling mechanism and circuits shown in Figs. 17 and 18.

Referring to Figure 17 and Figure 1, the complete sender has shaft 56, brush 200, code discs 201 with starting or spacing arcs 256, generator 270, and output wires 209 and 271 as hereinbefore described. In Figure 17 there are added the cam 760 fixed to sender shaft 56; also, cam switch 761 comprising tongue 762, normal contact 763 and outer contact 764; also, manual switch 765. Wire 766 connects generator 270 to frame conductor 212 and thus to all of the code discs 201. Wire 767 connects all of the brushes 200 to contact 763. Wire 768 connects contact 764 to manual switch 765. Wire 769 connects the manual switch to generator 270. Cam 760 is adjusted upon the shaft 56 at such an angle that the cam engages the switch tongue 762 only in the interval that recess 256 is passing brush 200.

The two wires 775 connect wires 209 and 271 to wires 472 and 469 respectively, and represent any channel of communication, including two switching devices, such as is shown in Figure 1, connecting the wires 209 and 271 at the sending station to the wires 472 and 469 at the receiving station in Figure 1, or such as is shown in Figures 15 and 16.

Wire 472 is connected to operating winding 470 of receiving printer 471, and thence by wire 780 to normal contact 781 of cam switch 782. Wire 472 is connected also to the winding of slow-release relay 784 and thence by wire 785 to outer contact 786 of cam switch 782. Tongue 788 of the cam switch is engaged by cam 790 fixed upon shaft 552.

Referring to Figures 17 and 18 and with reference also to Figure 12, both Figures 18 and 12 show the shaft 552, and pinion 553, also regulated power shaft 513, and its gear 550 meshing gear 551. The printing wheel 554A in Figure 17 is similar to the printing wheel 554 in Figure 12 except in number of edges 565, the wheel 554A having eighteen edges, corresponding to the eighteen vertical rows of scanning unit areas in each character as shown in Figure 24.

As seen in Figure 18, a friction clutch 792 is interposed between gear 551 and shaft 552. A flanged sleeve 793 surrounds shaft 552, is pinned to the shaft at 794, bears the flange 795 and has its end externally threaded at 796. Ring 797 is threaded upon sleeve 793 and locknut 798 locks ring 797 in its adjusted position. Loose ring 799 surrounds sleeve 793 and has a lug 800 which projects into a notch in the edge of the tight ring 797, so that flange 795 and ring 799 must turn with shaft 552. Gear wheel 551 is loose upon sleeve 793 and turns between elements 795 and 799. Friction washers 801, 802, such as oiled felt, are placed on either side of gear wheel 551 and spring 803 compresses elements 799, 802, 551 and 801 against flange 795 with a degree of pressure which is adjustable by moving the screw-threaded ring 797.

Stop disc 805 with its hub 806 is pinned to shaft 552 by pin 807. Referring to Figure 17, stop disc 805 has stop notch 808 which is engaged by stop latch 809 pivoted to the printer frame at 810. Stop spring 815 extends from the stop latch to the frame at 816 and tends at all times to draw the stop latch into stop notch 808. Stop latch 809 carries start armature 817 of start magnet 818. The circuit of the start magnet extends from earth through battery 819, winding of start magnet 818, wire 820, contact 821 of relay 784 and armature 822 of relay 784 to earth.

The operation of the modification shown in Figures 17 and 18 is as follows:

When the motors are started, with the switch 765 open and with no line signals, relay 784 is not energized, start magnet 818 is not energized and stop spring 815 draws stop latch 809 into stop notch 808 and stops shaft 552, since the friction clutch allows driven gear 551 to slip with respect to shaft 552, thereby stopping printing wheel 554a and also stopping tape 560.

To start the transmission, the operator at the sending station closes switch 765 and at every revolution of the shaft 56 the lug 760 engages switch tongue 762 to break contact with switch finger 763 and close contact with finger 764 to send a starting-signal pulse from generator 270 through wire 769, switch 765, wire 768, switch contact 764, switch tongue 762, wires 209, 775, 472, winding of relay 784, wire 785, switch contact 786. The cam 790 being in the position shown in Figure 17, the start pulse passes to switch tongue 788, and wires 469, 775, to generator 270, thus energizing the relay 784 which operates its armature and closes its points.

Current then flows from battery 819 through winding of start magnet 818, wire 820, contact 821 and armature 822 to earth, energizing start magnet 818 to operate its armature 817 thus drawing stop latch 809 out of stop notch 808 and permitting the shaft 522 to revolve due to the friction clutch between continuously driven gear 551 and the shaft. The pulses through cam switch 761 and slow release relay 784 are repeated regularly and slow release relay 784 is adjusted to hold its armature continuously under control of the pulses when unison of operation of the sender and receiver shafts is maintained. Under such conditions the current through starting magnet 818 is continuous and stop latch 809 is not permitted to drop into the stop notch. Shafts 56 and 552 then run freely and continuously and in approximate synchronism.

It will be understood that the slow release relay 784 is so designed that it will hold armature 822 for one complete revolution of shaft 552. With shafts 56 and 552 running in synchronism, a pulse will be sent over the line due to cam 760 engaging switch tongue 762 when cam 790 causes engagement of contacts 788 and 786, to thus impart a current pulse to relay 784. This periodic pulse is sufficient to hold armature 822 for another revolution of shaft 552.

A correction, such as illustrated in Figure 19 may be attained by manual adjustment of the orientation device of Figure 12B. Moving magnet 528 through an angle about shaft 513 will add that angle to movement of this shaft and will raise or lower the line of printing on the receiver tape.

Should shaft 552 run slightly faster than shaft 56, the angular gain will be cumulative and presently cam 790 will have released cam switch 782 before the pulse is sent from cam switch 761. The pulse thus diverted will flow through operating coil 470 and will mark tape 560 but further, the absence of the pulse from relay 784 will permit that relay to release its armature, thus deenergizing magnet 818 and releasing its armature. Stop spring 815 draws the stop latch into the stop notch at the next revolution of shaft 552 and stops this shaft with cam switch 782 closed. Immediately thereafter, the starting pulse is received and starts shaft 552 as above described. The stoppage constitutes a correction of the angular position of shaft 552 and it may occur every dozen revolutions, or at intervals of a thousand or more, depending in its frequency of occurrence and upon the accuracy of adjustment of the motors in synchronism. The extent of the angle of correction at each such action may be predetermined by the design of the length of the high-radius arc of cam 790. This arc should be maintained sufficiently short to leave a blank or signal-less interval between the start signal and the code signals of intelligence transmission, so that relay 784 will receive no current when slight correction is required. Should a large correction be required, the first space between words in transmission will effect the complete correction.

Should shaft 522 run slightly slower than shaft 56, the pulse from cam switch 761 presently will be received before cam switch 782 is shifted to guide the pulse to relay 784. Again relay 784 will lose the pulse, will release its armature, will de-energize the magnet 818 and will stop shaft 552. Under the conditions of this stoppage, shaft 552 will remain stopped during nearly one revolution of power wheel 551, and will start in proper corrected angular relation with the shaft 56 upon receipt of the next start pulse.

The two shafts 56 and 552 being in synchronous rotation with or without periodic correction, the operator at the sending station 260 operates the latch 98 (Figure 2) and permits the sender to position selected brushes 200 successively against their respective code discs 201 under control of tape 63. The brushes approach and recede from the code discs during the passage of the blank or starting arc 256 as above pointed out.

Referring to Figure 17, it will be seen that the correcting pulse is sent during the interval when the arc 256 is passing the brushes and thus is sent between the code signals for letters, or during that time in which the white interval or space between two letters is being formed on the tape by reason of driving the tape without line signals in operating coil 470. Between correcting signals, the selected disc 201 engages its brush 200 intermittently and code signals are sent from the generator 270 through wire 766, discs 201, brush 200, wire 767, switch contact 763, switch tongue 762, wires 209, 775, 472, operating coil 470, wire 780, normal switch contact 781, switch tongue 788 and wires 469, 775, to generator 270. Sending and recording a character therefore is effected between starting signals of cam switch 761.

The effect of a momentary stoppage of the printing wheel to effect angular correction when the printing wheel is running slightly too fast is shown in the tape 823 in Figure 19. The printing wheel 554A is adjusted angularly upon the shaft 552 to secure the proper alignment of the letters upon the tape 823 when the correction pulse has acted.

When utiliziing this form of correction the receiver may be operated from locally governed constant speed motors, as for example, synchronous induction motors operated preferably as closely as possible at the same speeds, or with the receiver driven slightly faster than the sender.

As previously pointed out, the printing wheel 554A is provided with eighteen spiral edges 565 corresponding to the eighteen vertical rows of scanning unit areas for each character, as seen in Figure 24. Since the correcting or stop impulses are transmitted to the printing receiver at a definite point in the transmission of each character, namely, when the starting or spacing arcs 256 are adjacent the brushes 200, the printing wheel 554A is positioned on its shaft 552 in such manner that cam 790 allows the switch contact 788 to engage contact 781 so that the initial imprint on the tape corresponding to the beginning of a character occurs when the spiral edges 565 are in the position shown dotted in Figure 8. In this figure it will be noted that the knife edge 567 crosses two spiral lines 585 (corresponding to spiral edges 565), these two points of contact 567a and 567b being nearly equally spaced from the two opposite edges of the tape 560. If printing of the character R for example, began when the parts were in the position shown dotted in Figure 8, this character would be imprinted as shown on the left-hand side of the tape in Figure 8; that is, with one full character placed centrally of the tape and two half characters on opposite sides thereof. The printing wheel 554A, having been initially positioned on its shaft 552 with proper relation between the printing edges 565 and the stopping notch 808 and cam 790, the resultant printing will be continuously maintained with one row of characters approximately in the center of the tape as shown in Figure 9.

*Start-stop synchronization*

In our improved start-stop system of telegraphic transmission the printing wheel is started at the beginning of every character and stopped at the end of every character. While this system of synchronization, as will be apparent, is applicable to continuous automatic transmission it is especially adapted to direct keyboard sending as hereinafter described in which irregular intervals may intervene between the transmission of successive characters of a message.

Referring to the apparatus shown in Figure 20, in comparison with Figure 18, the printing wheel 554B has but seventeen teeth or spiral edges and relay 784b is a quick-acting relay. Figure 21 shows a short-edge printing element 824, corresponding to member 566 of Figures 6 and 7. Figure 22 shows the resultant effect on the record on the tape, when the receiver of Figure 20 is used.

In operation the receiver of Figure 20 cooperates with sender 260 of Figure 17. Shaft 552 of Figure 20 is adjusted to 18/17ths the angular speed of sender shaft 56.

With motors and shafts running at proper speeds, the operator at the sending station closes switch 765. As described in connection with Figure 17, cam switch 761 sends a pulse each revolution which passes from the generator 270 (Figure 17) through wire 769, switch 765, wire 768, contact 764, cam switch tongue 762, wire 209, line channel 775, wire 469, (Figure 20), cam switch tongue 788, contact 786, wire 785, winding of the relay 784B, wire 472, line channel 775, and to generator 270. Relay 784b operates and energizes magnet 818 which draws stop latch 809 from stop notch 808 thus starting shaft 552 of Figure 20. In the start-stop receiver of Figure 20, relay 784B quickly releases its armature and deenergizes magnet 818. Spring 815 then draws the stop latch against stop wheel 805 and the stop latch engages stop notch 818 when shaft 552 has made one revolution and when shaft 56 has made but 17/18ths of one revolution. Shaft 552 remains stopped while shaft 56 completes its revolution and the start is repeated, and thereafter indefinitely.

When the operator at the sending station has operated latch 98 to release cam follower 67 (Figure 1) full character codes will be transmitted from brush 200 in Figure 17 to operating winding 470 in Figure 20 between start pulses.

In the record made by this variation of the system of our invention, the line of characters will not stray far from the middle of the tape and a narrower line of printing will suffice. By shortening the edge 567 (Figure 7), as shown at 824 in Figure 21, the effect upon the tape 825 will be as shown in Figure 22.

Photo-electric system

In the embodiments of our invention as thus far described, the characters to be transmitted have been pre-scanned, as explained in connection with Figures 2, 3, 23 and 24, to thus expedite transmission. Direct scanning and photographic reproduction as employed in a novel system will now be described.

One form of photo-electric scanning of a sending tape is shown in Figure 25 and photographic recording upon the receiving tape is shown in Figure 26.

Power shaft 13 of Figure 5 appears in Figure 25. Shaft 13 carries pinion gear 851 which meshes with gear 852, upon shaft 853. Fixed to shaft 853 is scanning disc 854 having holes 855. Also fixed to shaft 853 is large gear 856 in mesh with small gear 857 upon shaft 858. Upon shaft 858 is the light interrupter 859 which serves to break up the transmitted signals into currents of voice frequency. The number of wings on interrupter 859 and the ratio between gears 856 and 857 may be predetermined as required.

Also fixed upon shaft 853 is gear 860 in mesh with gear 861 on shaft 862. Shaft 862 carries gear 863 in mesh with gear 864 on shaft 865 which carries driving roller 866. Roller 866 engages tape 867 upon which are sending record characters 868.

Adjacent to scanning disc 854 is a system of optical condensers 875 arranged upon an axis line 876 of the transmitting light beam, which preferably is parallel to the axis of shaft 853. Lamp 877 is positioned upon axis 876 and is connected to battery 880 which supplies the operating energy thereto.

Holes 855 in disc 854 are arranged in a circle so that all holes may intersect axis 876. Shield 878 stationarily mounted on the frame has two arms 879 which span axis line 876, and which have a distance between them equal to the distance between successive holes 855 so that only one hole at a time is in the field between the arms. Sending tape 867 intersects the axis line 876 of the transmitting beam. Photo-cell 886 is connected in series with battery 887 and resistance 890 and wire 891. Wire 892 connects resistance 890 to filament 893 of thermionic valve 894. Wire 895 connects wire 891 to grid 896 of valve 894. Plate 897 is connected by wire 899 to one end of induction coil 273 and filament 893, heated by the battery 898, is connected through battery 900 and wire 901 to the other end of induction coil 273, from which a transmission circuit extends over wires 276, as seen in Figure 1 for example, although obviously my novel scanning apparatus and method are not limited to any specific transmission circuit.

Referring to the photographic recorder or receiver of Figure 26, adjustable governor shaft 552 of Figure 12 appears in Figure 26 and bears scanning disc 910 and gear 911, in mesh with gear 912 on shaft 913. Gear 914 on shaft 913 meshes with gear 915 on shaft 916, which bears roller 917 having the companion roller 918. Tape 919 passes between rollers 917 and 918 and then passes through tank 920. At 921 are shown undeveloped photo effects and at 922 are shown developed characters upon the tape 919.

In disc 910 are a number of holes 930 arranged in a circular arc. A system of optical condensers 931 is positioned upon an axis 932 preferably parallel to the axis of shaft 552, and intersecting the path of holes 930, and also intersecting tape 919.

Neon lamp 933 is positioned on axis 932 and optical condensers 931 are arranged to throw a beam of light 932A on disc 910 whose diameter is at least equal to and preferably is slightly greater than the spacing between three holes 930. There are thus at least two holes within the area 932a of the light beam at all times and a signal pulse cannot be lost. If this provision was not made, exact synchronism of the transmitter and recorder would be necessary or else some light impulses would be received when there was no hole in the area of the light beam and there would be no corresponding record made.

By the arrangement described, a further advantage is obtained in that duplicate records are printed as shown on tape 922 so that if transmitter and receiver are not in exact synchronism, at least one complete and legible message will be printed.

If the receiver is running out of synchronism, as disclosed by an examination of the tape, the orientation adjustment shown in Figure 12B can be manually adjusted to obtain the printing of the record with one full row of characters in the center of the tape and synchronous speed may be easily maintained by this adjustment.

The neon lamp 933 is connected in series with battery 936, resistance 937 and wire 938. Battery 936 is connected through battery 939 to filament 940, heated by battery 941 and forming a part of thermionic valve 942. Wire 938 is connected by wire 943 to plate 944 of valve 942. Grid 945 of valve 942 is connected through battery 946 to induction coil 433 and filament 940, also is connected by wire 947 to induction coil 433 corresponding to coil 433 of Figure 1, but obviously this novel photographic receiver is not limited to use with the transmission system of Figure 1.

The spacing of holes 855 in disc 854 is slightly greater than the height of the symbols or letters on tape 867. This has the effect of giving a blank space between vertical rows of letters on receiver tape 919, similar to the record shown in Figure 9.

The operation of the photo-electric sender of Figure 25 is as follows:

Power shaft 13 turns disc 854, light interrupter 859 and roller 866 at predetermined speeds and thus drives the tape continually, lamp 877 emits light to the optical condenser system 875, which forms upon axis 876 a beam of light which impinges upon disc 854 between the arms 879 of shield 878. The spacing of arms 879 being equal to the distance between successive holes 855, it follows that one hole 855 will be exposed at all times between the arms of shield 878 and through the exposed hole a ray of light 950 will pass to the tape 867, and there be reflected to photo-cell 886.

It will be obvious that this novel transmitter is not limited to use a light ray reflected to the photo-cell since a stenciled tape might be used and the light ray pass directly therethrough to the photo-cell.

Motion of disc 854 will cause the ray of light 950 to traverse a character 868 on tape 867 from the bottom of the character to the top and then the light will be repeated through the next hole 855 from the bottom of the top of the character over a succeeding line of the character since roller 866 will have moved tape 867 through the required minute distance while the ray traverses the height of the character. The ray 950 thus will scan successive lines of the character, scanning each line from bottom to top and scanning successive lines from left to right.

During this action of scanning, rotation of the light interrupter 859 has rapidly interrupted the beam of light, and therefore, has interrupted ray 950 at a desirable speed, say 1200 times per second, so that the light when and if received by the photo-cell will be in the nature of 1200 flashes per second. This rapid interruption of the light results in transmission of electrical impulses of voice frequency which may be transmitted over standard voice frequency channels of the nature described in connection with Figure 1, or over radio channels.

This operation will produce 1200 electrical impulses upon the grid 896. Photo-cell 886 is energized by a current of the circuit including battery 887, resistance 890 and wire 891. The drop of potential through resistance 890 impresses that potential between filament 893 and grid 896. Operation of the photo-cell by the flashing action of ray 950 will vary the potential of grid 896 as compared with filament 893, and thus produce output pulses of current in the output circuit of valve 894, which circuit comprises battery 900, wire 901, winding of induction coil 273, wire 899, plate 897, filament 893, wire 901 and back to battery 900. The action of induction coil 273, in transferring these pulses to wire 276, will produce an alternating current of a desired voice frequency, say of 1200 cycles per second, impressed upon wires 276, after which (see Figure 1) the current will be propagated through switches, local lines, telephone switchboards, and channels of communication of any type suitable for voice frequency to repeating induction coil 433 of Figure 1, after which the record may be made upon any suitable receiving apparatus, such as the circuits and printer of Figure 1, or any other form of receiver described elsewhere herein.

Operation of the receiving apparatus, Figure 26, begins with the action of repeating coil 433, which in accordance with the received signals impresses an alternating current upon grid 945 and filament 940 of valve 942, through wire 947 and battery 946.

The source from which the signals are sent and the communication channels over which the signals are propagated to reach the induction coil 433, is not of the essence of the description in the study of this figure, since the signals may originate in a device modeled upon the disclosure of Figure 25 or of Figure 15 or of Figure 1, or any other suitable transmitting mechanism.

The signals impressed upon grid 945 are alternating in nature and of voice frequency. These signals are repeated in amplified intensity over the discharge circuit comprising battery 939, filament 940, plate 944, wire 943, wire 938, neon lamp 933 and battery 936. There is also the derived circuit or shunt 937, which reduces the current through lamp 933 and which preserves the continuity of the current through plate 944 during periods of inactivity of lamp 933. The circuit including battery 936, resistance 937, wire 938 and lamp 933 provides for lamp 933 a potential nearly sufficient, yet insufficient, to operate lamp 933. When the plate current of valve 942 increases, the potential upon lamp 933 is raised to operating value and lamp 933 glows. On the other hand when due to the control of the grid 945, plate current from valve 942 decreases, potential upon lamp 933 is decreased and the lamp darkens.

Each positive pulse of voice frequency upon grid 945 thus propagates a signal to flash lamp 933, which responds with rapid flashes of voice frequency when current is received from induction coil 433, and which remains dark when no such current is received. By the flashing of lamp 933, light is supplied to the system of optical condensers 931, and a beam of light 932a is impinged upon disc 910 and passes through two holes to impinge in two places upon the photo-sensitive recording tape 921. By motion of the tape and the regulated speed of disc 910, letters will be formed in latent photographic images 921, upon the moving tape 919, which then passes through the developing tank 920 of any suitable type, and emerges with a visible record, as shown in characters 922. The nature of the record is similar to that discussed in connection with Figures 10 and 11, and is subject to the same corrective measures. The shaft 552 is subject to the corrective measures discussed in connection with Figures 17 to 22 inclusive, and the modification shown in Figure 26, therefore, is available for start-stop or corrective-start reception as well as for continuous synchronous reception as described.

It will be noted that a white area upon sending tape 867 will produce the flashing ray 950 and thereby will cause electrical pulses for propagation over the signalling channel. This transmitted signal will operate neon lamp 933 to produce light which impinges upon recording tape 919. With customary chemical reactions, the record tape will be of dark background with white characters.

Should it be desired to obtain a white background with dark characters, as shown in Figure 3, any of the following processes may be used:

(a) A chemical reaction of positive-print nature which develops the light-changed tape areas into a lighter or more transparent film than the unchanged areas. (b) Daguerreotypy, using a black tape and developing the light-changed areas into white or gray, the unchanged areas remaining transparent, permitting the black tape to be seen. (c) Image reversal by elimination (as by potassium-permanganate) and redevelopment. (d) The signals may be rectified and then reversed when applying them to the neon lamp.

*Keyboard start-stop transmission*

Where the start-stop system of transmission is used, the signal codes for the several characters may be sent at irregular intervals by a manual device and yet appear always in suitable form and position upon the tape because the tape stops between receipt of the several characters.

A sending device suitable for transmission of this nature is shown in Figure 27, which is a broken perspective to show parts more clearly. Motor 961, whose speed is regulated by governor 962 drives shaft 963, bearing gear 964, which meshes with gear 965. Gear 965 is sleeved upon shaft 966 and is the power member of a friction clutch comprising flanges 967 and 968 which turn with shaft 966. Friction washers such as felt 969 are between the flanges and wheel 965. Loose flange 968 is pressed by spring 970 and thus keeps a uniform friction upon the clutch when the device is running. Spring 970 abuts nut 971 and locknut 972, upon sleeve member 973 which at 974 is pinned to shaft 966. Upon shaft 966 is mounted scanning disc 980 having two series of scanning holes 981 through which a ray of light may pass from lamp 982.

Lamp 982 is connected to the source of current 983 and is located in the axis of the optical condenser system 984 which may concentrate the rays of the lamp into a beam 985 reflected by prism 986 through a type mask or stencil 987 and lens 988 to project a character in light as shown at 989 upon rotating disc 980. The type mask 987 comprises an opaque member having the characters cut therethrough, similar to a stencil sheet whereby light rays passing through an opening formed by a stenciled character will throw the character on the disc 980. Holes 981 in each series are of any suitable number for effective scanning, and the distance between holes is equal to or slightly greater than the height of the character 989 and the radial distances of the holes from the axis of the shaft 966 are variant so that the most distant hole of each series, when turned by the disc, will traverse the distant edge of a character and the hole nearest the axis of each series will traverse the nearer edge of the same character, the intervening holes traversing intervening lines equally distant from each other in the body of the character.

A further spaced ray of light 990 and larger holes 991 in the disc 980 which intersect the ray 990 are provided adjacent the beginning of each series of holes 981 to transmit a "start" pulse of light to photo-cell 1000, positioned in back of disc 980. Holes 991 are positioned to align with ray of light 990 prior to the first hole 981 of each series coming into alignment with light ray 989 so that each scanning operation is preceded by a start signal. Following each series of holes 981 is a blank section of disc 980 which intercepts beams 989 and 990 in normal position and imposes a stop condition on the transmission circuit.

Photo-cell 1000 is positioned behind disc 980, and is connected in series with wire 1001, battery 1002, battery 1003, resistance 1004 and wire 1005. Wire 1006 extends from the point between the batteries to filament 1007 of thermionic valve 1008, the filament 1007 being heated by battery 1009. Wire 1010 connects wire 1005 to grid 1011 of valve 1008. The output of energy from valve 1008 will occur from plate 1012 and from wire 1013, which may be connected through a transmission channel or directly to the input wires of a suitable receiver such as wire 775 of Figure 20. While scanning holes shown in Figure 27 are arranged in two sets 981 and 981' each occupying about 180° or one-half of the complete circle, and each set of holes 981 serves to completely scan a character, and is provided with a "start" pulse opening 991 and suitable stop mechanism to be described, it will be obvious that one set of scanning holes may occupy 360° of the disc or any portion thereof.

Scanning disc 980 has two notches 1021 in the rim thereof, which are engaged by latch 1022 pivoted to the receiver frame at 1023 and pressed by a flat spring 1024 fixed to the frame at 1025. Pins 1026 carried by scanning disc 980 are positioned to strike tail 1027 of latch 1022. Operating arm 1028 of latch 1022 is adapted to be engaged by arm 1029 which is an integral extension of universal bar 1030 pivoted upon shaft 1031. It will be understood that a stop notch 1021 and stop pin 1026 are provided for each set of scanning holes 981 and 981' and are correctly positioned to function in a manner to be described. Universal bar 1030 is shown unoperated at the portion labeled 1030 and is shown operated in the dash and dot line position of the same bar labeled 1030'. A number of latches 1035 equal in number to the number of key levers 1036 are pivoted also with bar 1030 upon shaft 1031, and each of them has its individual spring 1037 which draws it toward universal bar 1030. Keylevers 1036 are pivotally mounted upon universal support 1040, each keylever having a notch 1041 which surrounds pivot edge 1042 of support 1040, and each lever is under tension of its individual spring 1043. Each lever 1036 is provided at its front end with a finger piece 1045, and at its back end with a lug 1046 and a notch 1047. Lugs 1046 are engaged by shoulders 1048 of latches 1035 and notches 1047 may receive the edge of the universal bar 1030 when a keylever is depressed at its front end and elevated at its back end about pivot 1042 as is shown in the case of the lever 1050.

A plurality of bellcrank levers 1055 are pivoted in an arc, one lever for each keylever 1036. Upper ends 1056 of bell-crank 1055 form a circle within which moves the type-slide actuator 1057 pivoted to the frame at 1058, and engaged by one or the other of two operating fingers 1059 and 1060. The two operating fingers are pivoted on the shaft 1062 and each has a power receiving bail 1063 which passes under a number of keylevers 1036. Each of the bellcrank levers 1055 has its horizontal end 1064 in engagement with the upper edge of one of the keylevers 1036.

Projection mask or type stencil slide 987 slides upon a guide 1070 of circular arc form and of open central section to permit the beam 985 to pass. Guide 1070 is supported upon two sliding posts 1071 which slide vertically in fixed guides 1072 when urged upward by shift lever 1073 pivoted to the receiver frame at 1074 and operated by manual key 1075. Two downwardly projecting fingers 1076 form a yoke through which oscillatory actuator 1057 projects, whereby oscillatory movement of member 1057 will shift mask 987 along guide 1070. It will be understood that mask 987 has a double row of characters, and the lever 1073 operates the shift whereby the lower set of characters, such as the capital letters and figures may be transmitted in the upper position of mask 987.

The operation of the transmitting device of Figure 27 is as follows:

With the motor running at regulated speed and with all of the parts at rest by reason of the engagement of the latch 1022 with one notch 1021 of the scanning disc 980, friction clutch members 967 and 968 slipping, a finger-piece or key as 1045, may be depressed to operate a keylever, as 1050. Before depression of the key, universal bar 1030 is in the position shown in full lines at 1030, and all latches 1035 are held back by engagement of all shoulders 1048 with all of lugs 1046. In this position of parts a stop condition is imposed on the line as above pointed out, due to interception of beams 989 and 990 by a blank or stop section of disc 980.

When keylever 1050 is depressed at its front end, the back end will rise until its lug 1046 moves out of the way of shoulder 1048 of its cooperating latch 1035 by which time notch 1047 of the operated keylever 1050 will be high enough to receive the edge of the universal bar 1030. The released latch 1035 will be urged by its individual spring 1037, and will move its shoulder 1048 under lug 1046 of keylever 1050, at the same time engaging and moving universal bar 1030 into notch 1047 of keylever 1050. Thus keylever 1050 will be locked against return, and counterclockwise movement of the universal bar 1030 about its pivot 1031 will occur due to pressure of the released latch 1035 and will move its integral extension arm 1029 and lift arm 1028 to rotate latch 1022 upon pivot 1023, which at the same time will withdraw the latch from notch 1021 of disc 980, and will move tail 1027 into the path of the pins 1026 of the disc 980.

Depression of a keylever such as 1050 will rotate one or the other power bail 1063 depending upon which side of the machine the keylever 1050 is positioned. Rotation of a power bail 1063 will move its operating bar 1059 or 1060 to the left and due to engagement of bars 1059 with pivoted member 1057 secured to mask 987, the type mask will be rotated about its pivot 1058 until yoke fingers 1076 engage the bellcrank latch 1055. When keylever 1050 was operated, upward movement of its rear end raised end 1064 of its individual bellcrank 1055, so that the oscillatory movement of mask 987 is stopped when the stenciled character therein corresponding to the operated keylever aligns with ray 985.

The disc 980 will pick up its full speed at once when released and will transmit signals to the line wires 775 as follows: First, the hole 991 at once aligns with ray 990 to allow this ray to pass to photo-cell 1000 which will immediately vary the current in the circuit of the resistance 1004, which will vary the difference of potential existing between filament 1007 and grid 1011 and this will produce a current over wire 1013, battery 1002, wire 1006, filament 1007, plate 1012, and output wires 775. This is a "start" pulse for the receiving station and may serve to start the receiver such as shown in Figure 20 or any other suitable receiver of the start-stop nature. A series of holes 981 now will scan the image of character 989 thrown on disc 980 from the bottom to the top of the character and successively from the beginning to the end of the character, the character being inverted in its projection upon the disc 980. This scanning of the selected character will result in the transmission of a suitable series of marking and spacing conditions of the type sent by code discs 201 for similar characters, each preceded by a start condition and followed by a stop condition.

When a key in the right-hand half of the keyboard is depressed, bail 1063 on this side of the keyboard will be depressed, operating finger 1059 will move toward the left, as viewed in the drawings, and operating member 1057 will be rotated upon fixed pivot 1058, thus carrying the mask 987 along its guide 1078 toward the right-hand end of the guide until member 1057 engages the upper end of the operated bellcrank 1055. Back end of the keylever 1050 when rising has engaged back end 1064 of one of its associated bellcranks 1055 and by the lifting of the back end, has advanced front end 1056 of that bellcrank into the path of operating member 1057. When the operating member 1057 stops against the operated bellcrank, the mask 987 will be in proper position to project upon the scanning disc 980, that character 989 which corresponds to the finger piece 1045 on the keylever 1050.

At the conclusion of a half revolution rotation of scanning disc 980, one pin 1026 will strike tail 1027 of latch 1022 and will operate the latch to operate arm 1029 to overcome spring 1037, and thus to restore universal bar 1030 from its operated position 1030' to its unoperated position. Latch 1022 when operated by pin 1026 will be in position to engage the corresponding notch 1021 to stop scanning disc 980, and universal bail 1030 when thus operated will release keylever 1050, which will be returned by its spring 1043, it being presumed that the keyboard operator has removed his finger from finger piece 1045. Scanning disc 980 will then come to rest in the position shown in Figure 27 with beams 989 and 990 intercepted by the blank or stop single section of the disc and a stop condition will be imposed upon the transmission circuit. Should key 1075 be held down while key 1045 is operated, the figure or shift character will be projected at the point 989.

Should the operated key be in the left half of the keyboard, operating finger 1060 instead of 1059 would be effective upon operating member 1057.

It will accordingly be seen that output of signals on wire 775 is of the nature of direct current which is interrupted in a code manner. Should it be desired to use the keyboard sender of Figure 27 in connection with transmission channels of the nature shown in Figure 1, this may be accomplished by adding the light interrupter of Figure 25, introduced into the beam 985 of Figure 27, thus securing interruptions of the order of voice frequencies.

Another type of keyboard sender embodying our inventions, in which prescanned code discs are used, is shown in Figure 30 with mechanical details in Figures 31, 32 and 33. In this figure, power shaft 13 has governor wheel 14 and gear 1101 in mesh with gear 1102 on main shaft 1103. Main shaft 1103 has friction clutch 1104 pinned to it at 1105 and thus drives frictionally cam disc 1106. The remaining details of the clutch are mechanically the same as clutch 792 of Figure 18, described above. Shaft 1103 has keyway 1110 and carries a plurality of feathered discs 1111 which constitute the power members of a multiple clutch, the driven members of which are code discs 1112 and the friction members of which are friction washers 1113. All of the members of this multiple clutch are compressed by spring 1114 which is adjusted by nut 1115 and locknut 1116. Feather 1117 of each disc 1111 engages keyway 1110. Each code disc 1112 has a stop pin 1118 which engages a stop finger 1119 on a keylever 1120. There are a plurality of code discs 1112 similar to code discs 201, but each provided with start and stop condition transmitting sections of the code disc, as will more fully hereinafter appear. One code disc is provided for each symbol to be transmitted, and a plurality of keylevers 1120 are provided, one for each code disc, each having a finger piece 1122.

The keylevers are pivoted upon a common pivot 1121. Each code disc has an electrical contact brush 1126, and all of these brushes are electrically connected to the conductor 1127. The brushes are suitably supported on the sender frame, not shown.

Upon pivot rod 1130 is universal bail 1131 under tension of its spring 1132 which extends to the sender frame. Bail 1131 passes under and normally engages all keylevers 1120, and has trip arm 1133 which engages trip lug 1134 on cam disc 1106. Disc 1106 has the keylever unlocking cam pin 1135 which constitutes a cam element with cam follower 1136 pivoted at 1137 under tension of spring 1139 extending to the sender frame. Cam follower 1136 has a yoke 1138 spanning pin 1140 on bellcrank 1141, pivoted at 1142, and having yoke 1143. Yoke 1143 spans flat spring 1145 fixed to locking slide 1146, which slides under all keylevers 1120 and which has a notch 1147 normally registered with each keylever to permit the operation of the keylever. Referring to the Figures 31 and 32, an electrical brush connection 1151 is provided for each code disc 1112, and all brushes 1151 are connected to a conductor 1152. Brushes 1152 are mounted upon a common support 1153 which is fixed in the sender frame. Neither brush 1126 nor brush 1151 has any movement other than to yield to any irregularity in its associated code disc. A high-radius arc 1154 for sending a starting pulse is added to the character transmitting arcs of the code discs of Figures 32 and 33 and 23, preceding the character transmitting sections or arcs, and is provided with a depressed stop signal arc 1154' following the character transmitting sections of the code discs. Stop arcs 1154' of the code discs are positioned opposite the ends of brushes 1126 when the code discs are in their normal rest position as shown in Figure 30. With all the discs in this position, a stop condition is imposed upon the transmission circuit.

In Figure 33 the arrangement of parts is similar to the arrangement in Figure 32, with relay 1156 added. Wires 1152 and 1127 are connected through battery 1155 and sending relay 1156. Tongue 1157 of the relay 1156 is connected directly to line wire 1158. Back contact 1160 of the relay is connected through ballast resistance 1161 to battery 1162 which connects its positive pole to line wire 1163 and front contact 1164 of the relay is connected through ballast resistance 1165 to battery 1166 which connects its negative pole to line wire 1163.

In operation of the device of Figure 30, power shaft 13 runs continuously at regulated speed, and output conductors 1127 and 1152 are connected to a power source and to a transmission channel in any desired way as, for instance, similar to the conductors 209 and 210 of Figure 1. Depression of any finger piece 1122 will operate a keylever 1120 to enter its notch 1147 of locking slide 1146 and to withdraw its stop finger 1119 from engagement with a stop pin 1118 on its corresponding disc 1112, thus releasing its associated disc 1112, which will be driven by power from shaft 1103 imparted by feathers 1117 to the two members 1111 which flank the released code disc and thence through the friction washers to the code disc itself. The code disc will turn one revolution and pin 1118 will then re-engage its stop finger 1119, presuming that the key 1122 has been released meanwhile. Operation of keylever 1120 will depress universal bail 1131 against tension of spring 1132 and will operate trip finger 1133 to move out of engagement with trip lug 1134, and thus will release cam disc 1106. Disc 1106 will thus be released for rotation and will move cam pin 1135 out of engagement with cam follower 1136. Spring 1139 will rotate cam follower 1136 upon its pivot 1137, yoke 1138 will impart power to pin 1140, and will rotate bell crank 1141 about its pivot 1142 and yoke 1143 will bend flat spring 1145, it being borne in mind at this time that depressed keylever 1120 is in a notch 1147 of locking bar 1146 so that only a slight motion of locking bar 1146 is permitted. When finger piece 1122 is released, keylever 1120 will be raised by power from spring 1132 acting through universal bail 1131; this being permitted because lug 1134 by this time will have cleared from under the trip arm 1133. Released key-lever 1120 will rise out of a notch 1147 and flexed spring 1145 will move locking bar 1146 to bring the full height of bar 1146 under all keylevers, thus preventing operation of any keylever until the selected code disc 1112 has completed its revolution, at which time the operating disc 1106 will complete its revolution, stopping due to engagement of stop lug 1134 with stop arm 1133 and with cam pin 1135 in engagement with cam follower 1136. Cam pin 1135 will have operated cam follower 1136 to operate bellcrank 1141, to supply power through spring 1145, and to move locking slide 1146 back into its normal position in which a notch 1147 will be under every keylever 1120, thus unlocking all keys, any one of which then may be operated.

During the rotation of code disc 1112 (see Figure 32) the high arcs of the operated code disc have engaged in code manner the brush 1126, and the side of the disc 1112 has engaged continuously brush 1151, so that a complete cycle of conductive contacts of code nature has been formed between wire 1127 and wire 1152, and thus a signal has been effected on those wires for propagation by the line channel to which wires 1127 and 1152 are connected.

It will be understood that code discs 1112 are of the prescanning type shown in Figure 23, whereby signal pulses will be transmitted in accordance with a scanning of the character to be transmitted.

Transmission of characters each preceded by a start condition and followed by a stop condition thus occurs in uniform cycles but at irregular intervals as the keys are depressed variably by the keyboard operator and constitutes a transmission system suitable for start-stop receivers. The high radius arm 1154 provides the signal for starting the receiver, the remaining high arcs of the disc 1112 provide the marking signals for the record at the receiver, and the depressed arcs provide the spacing and stop signals or conditions.

Figure 32 discloses a system in which single current working is utilized, while Figure 33 discloses a system wherein double-current is used. In Figure 33, normal line circuit is from line wire 1158 through tongue 1157, back contact 1160, resistance 1161 and battery 1162 whose positive pole is connected to line wire 1163. When disc 1112 engages the brush 1126 an obvious local circuit is closed to energize sending relay 1156 which operates its tongue and forms the alternate line circuit from line wire 1158 through tongue 1157, front contact 1164, resistance 1165 and battery 1166 whose negative pole is connected to line wire 1163 thus transmitting marking and spacing conditions of opposite polarities. In single-wire working, wire 1163 is connected to earth.

Modified start-stop receiver

An alternative form of receiver is shown in Figure 28 with detail in Figure 29. Power shaft 552, cam 790, cam switch 782, starting magnet 818, stop latch 809 and stop spring 815 are the same as in Figure 18, and will be understood from the prior description thereof.

Power shaft 552 in Figure 28, it will be understood, is the power shaft of a start-stop receiver and therefore is turned through a friction clutch as 792 in Figure 18.

Power shaft 552 carries scanning disc 1170 and stop lug 1171 conveniently made integral with scanning disc 1170. Disc 1170 carries a plurality of scanning points 1172 arranged in a true circular arc and projecting from the disc, and polar line magnet 1173 has armature 1185 with printing platen at end 1174 which is just above the scanning points and which has a movement toward and from the points. Between points 1172 and armature platen 1174 are record tape 1175 and pigment tape 1176. The detail of polar magnet 1173 is shown in Figure 29 in which a horseshoe permanent magnet 1180 has pole pieces 1181 and 1182 of U shape, and between the pole pieces are positioned solenoid coils 1183, and pivot block 1184. Armature 1185 is pivoted at 1186 in block 1184, and extends through the two coils 1183, and is normally held with end 1174 disengaged from disc 1170 by spring 1177 secured thereto adjacent the opposite end.

Battery 1190 has potential about the same as that of battery 1162 of Figure 33, and has its positive pole connected by wire 1191 to wire 1163. Wire 1192 connects the solenoids of polar line magnet 1173 to normal contact 781 of switch 782. Line wire 1163 is connected directly to the solenoids of polar line magnet 1173. Wire 1193 connects starting magnet 818 to contact 786 of switch 782. Line wire 1158 is connected directly to tongue 788 of switch 782.

In operation of the receiving device of Figure 28, when used in connection with the sender of Figure 33, scanning disc 1170 is held motionless against the power of its friction clutch by latch 809. Potential of battery 1190 opposes potential of battery 1162 and current does not flow. Starting current pulse for example, transmitted from relay 1156 in response to contact of arc 1154 and brush 1126 (Figure 33) will pass from earth or wire 1163 through battery 1166, resistance 1165, contact 1164, tongue 1157, line wire 1158 (Figure 28) tongue 788, contact 786, cam 790 being in the stop position and holding contacts 788 and 786 engaged, wire 1193, starting magnet 818, battery 1190, wire 1191, and line wire 1163 or to earth, it being remembered that battery 1166 is of assisting polarity and operates with its potential added to that of battery 1190. Starting magnet 818 operates latch 809 and releases the scanning disc 1170, after which printing is effected as follows: Each marking condition from brush 1126 of Figure 33 produces a pulse through battery 1166 which passes through wire 1158, tongue 788, normal contact 781, wire 1192, solenoids 1183 of polar line magnet 1173 and line wire 1163 or earth return. Each such pulse moves armature 1185 to rotate clockwise about its pivot 1186 and to press its printing end 1174 against tapes 1176 and 1175, thereby pressing the tapes together and against scanning points 1172. The scanning points being in motion, it follows that a line of arcuate form will be drawn upon tape 1175 by transfer of pigment from tape 1176, and it will be understood further that the nature of the code signals which draw printing end 1174 against the tapes are such in time and nature that the resultant accumulation of marks upon tape 1175 will constitute a record thereon which will be the character telegraphed by the sender.

When the receiver of Figure 28 is in its stop position with cam 790 holding tongue 788 in engagement with contact 786, start magnet 818 cannot operate until a start pulse reverses tongue 1157 (Figure 33) since prior to such movement of tongue 1157 the two equal strength batteries 1162 and 1190 are opposing each other.

Armature-platen 1174 is lifted from scanning points 1172 by the electro-magnetic power given to the armature by the second battery 1162 which is included in the line circuit when the local circuit of sending relay 1156 is open and relay 1156 is not charged.

When this occurs battery 1190 is cut out of circuit since cam 790 has rotated so that tongue 788 does not engage contact 786. Therefore the pulse from battery 1162 passes by wire 1163, solenoids 1183, wire 1192, contact 781, tongue 788, wire 1158, tongue 1157, contact 1160, resistance 1161 and back to battery 1162. This reverse current through polar relay 1173 at once pulls its armature 1185 so that printing portion 1174 does not touch points 1172. Spring 1177 is not strong enough to interfere with movements of armature 1185 by solenoids 1183 but merely holds printing portion 1174 out of contact when the receiver is not in use. After each character has been recorded, the potential of reversed polarity from the battery 1162 continues upon the line wires, but when the cam 790 has operated the switch 782 the line circuit includes the two batteries 1162 and 1190, which are opposed in polarity and the starting magnet 818 is not operated because no current flows.

*Start-stop radio system*

Figure 34 discloses a circuit for start-stop radio transmission in a direct keyed oscillator sender for radiant energy. This oscillating circuit is a standard Hartley circuit keyed in the usual manner from code disc 1112.

Thermionic vacuum tube 1370 has filament 1371 associated with alternating current generator 1374 which is connected to primary winding 1375 of induction coil 1376, whose secondary winding 1377 is connected by wire 1378 directly to one terminal of filament 1371, and by wire 1379 to adjustable rheostat 1380 and to the other terminal of filament 1371. By these connections filament 1371 may be supplied with the current for heating. Condensers 1381 form a by-pass circuit for filament 1371 to draw off current components of high frequency values.

For polarization, plate 1373 is connected to direct current generator 1382 through inductance 1384, and resistance 1383, thence by wire 1385, adjustable contact 1386 on secondary winding 1377, then dividing through winding 1377 to both wires 1378 and 1379 to both terminals of filament 1371. The output circuits comprise plate 1373, wire 1387, condenser 1388, wire 1389, and to adjustable contact 1390 on winding 1391, through winding 1391 to adjustable contact 1392, wire 1393, code discs 1112, brush 200, and wire 1394 to adjustable contact 1386, dividing through winding 1377 over both wires 1378, 1379 to filament 1371.

The oscillation circuit comprises adjustable condenser 1395, connected from contact 1390, to contact 1396 on coil 1391, thus forming a resonant circuit from which a tap extends through condenser 1397 to grid 1372. Condenser 1397 is shunted by resistance 1398 and contact 1392 is positioned between contact 1390 and 1396 on coil 1391. Winding 1391 is inductively coupled with winding 1399 which is connected to antenna 1400 and to earth at 1401.

When connected and adjusted for sending, but not operating to send signals, generator 1382 polarizes plate 1373, generator 1374 heats filament 1371, and an oscillating current of small magnitude flows from plate 1373 through condenser 1388, coil 1391 and condenser 1397 to grid 1372. In operation code disc 1112 rotates, making contacts in code manner with brush 200, thereby permitting currents of greater magnitude to flow from plate 1373, through condenser 1388, contact 1390, winding 1391, contact 1392, wire 1393, disc 1112, brush 200, wire 1394, and contact 1386 to winding 1377 and wires 1378 and 1379 to the filament 1371.

Current through coil 1391 is transferred inductively to coil 1399 and is propagated as radiant energy from antenna 1400 at voice frequencies and these signals may be received and reproduced on any of the novel forms of receiving mechanisms disclosed in this application.

*Simultaneous two-way transmission*

An arrangement of equipment suitable for service in both directions at the same time is shown in Figure 14. The two-way transmission feature is shown as a modification which is applied to the system of Figure 1 and reference to Figure 1 may be made for a full understanding of the parts designated by characters lower than 1201.

In Figure 14, at left station 1201, alternating current generator 1202 has a frequency of (say) 800 cycles per second. The complete sending set 602 is connected by wires 209 and 271 to induction coil 273 and thence by wires 276 to low pass filter 1203.

Low pass filter 1203 is connected by wires 1205 to normal contacts 1206 of manual switch 1207, and is connected further by wires 1208 to high pass filter 1209 which is connected further by wires 432 to receiving induction coil 433 which then is connected through the uni-directional valves 1210 to receiver recorder 471.

Manual switch 1207 has operative plunger 1211 and outer contacts 1212 which are connected by wires 286 to complete telephone set 287.

Switch tongues 1213 are connected through local line wires 298 to switchboard 300, thence by a channel of communication 1214 to switchboard 400 of right station 1201a and thence by local line wires 416 to tongues 1217 of manual switch 1218. Switch 1218 has operating plunger 1219 and outer contacts 1220 which are connected by wires 426 to complete telephone set 427.

Switch 1218 has also normal contacts 1221 which are connected by wires 1229 and 1230 to low pass filter 1231 and further by wires 1229 and 1232 to high pass filter 1233 which is connected further through wires 428, sending induction coil 429 and wires 430 and 431 to complete sender 1240 whose alternating-current generator 1241 has a frequency of (say) 1400 cycles per second.

Low pass filter 1231 is connected through wires 432, receiving induction coil 433 and uni-directional valves 434 and 440 to complete receiver 471.

Filters 1203, 1209, 1231 and 1233 are constructed to pass frequencies above or below a determined critical frequency (say) 1100 cycles per second, as indicated by the legends in the figure. The minimum attenuation point of each filter will be a suitable frequency for the transmission from generator 1202 or 1241, indicated as 800 cycles and 1400 cycles by the legends in the figure.

The operation of the above system as a simultaneous two-way system will be clear from the following explanation, and Figure 14 when taken in connection with the explanation of Figures 1 to 12, and from Shea's book, above referred to. Signals transmitted from station 1201 will pass through the low pass filter 1203 since the frequency of said signal will be of the order of 800 cycles. The incoming signals from station 1201a being of the order of 1400 cycles will not pass through low pass filter 1203 but will pass through high pass filter 1209 to induction coil 433 and to receiver 471 to be there recorded in a manner as previously described in connection with Figures 5 to 11. Incoming signals at station 1201A will pass through low pass filter 1231 since these frequencies will be 800 cycles and are transmitted to receiver 471 and recorded in the manner hereinbefore described. Signals transmitted from station 1201A will pass through high pass filter 1233 to the outgoing lines 1214 but will not pass through low pass filter 1231.

It will thus be seen that filters 1203, 1209, 1231 and 1233 serve to selectively allow two-way simultaneous transmission of communication without interference. Since received communications are automatically recorded upon a tape, and communication to be sent out may be sent from a perforated tape, it will be obvious that the two stations may be arranged to automatically operate without an attendant. As previously pointed out, our novel arrangement whereby a double record is made upon the receiving tape to allow messages to be received and legibly recorded when the transmitting and receiving stations are not operated at exactly the same speed, will allow the full automatic operation of the system shown in Figure 14. Uni-directional valves 1210 and 434 and 440 function as previously described in connection with Figure 1.

Stations 1201 and 1201A are adapted for direct telephonic communication by switches 1207 and 1218 being adjusted to connect the tongues 1213 and 1217 to the outer contacts, thus forming a direct circuit for the telephone.

It will be seen that the system of Figure 14 is suitable solely for transmission by voice frequencies or carrier current frequencies. In Figures 35, 36 and 37, to be described hereinafter, systems are disclosed which are suitable for transmission of battery pulses of irregular lengths and of any alternating frequency, and not limited to voice frequencies or carrier frequencies.

Referring to Figure 36 wherein is shown a simple differential duplex transmission system showing one adaptation of our invention to prior telegraph practice, the apparatus comprises line wire 1251, two single-current senders 1252 and 1253, such as shown in Figure 2, two apex-balancing resistances 1254 and 1255, two sending batteries 1256 and 1257, two sending ballast resistances 1258 and 1259, two artificial lines 1260 and 1261 and two receivers 1262 and 1263, such as is shown in Figures 6 and 7 except that operating windings 470 have each a middle terminal 1264 and 1265 thereby rendering each of them capable of differential operation. The two batteries have like poles connected to earth.

The upper terminals of the two operating windings 470 are connected together by the line wire 1251 for signal propagation. The two lower terminals of operating windings 470 are connected to earth through artificial lines 1260 and 1261 respectively to balance the differential windings of the receivers. The middle terminals of the operating windings are connected to earth through the apex resistances 1254 and 1255 respectively and further are connected to earth by a branching signal sending path through the senders 1252 and 1253, ballast resistances 1258 and 1259 and the line batteries 1256 and 1257.

In operation, signal currents are generated in battery 1256, resistance 1258 and sender 1252, then divide and pass in part through resistance 1254 to earth and in part to terminal 1264 being divided there into equal currents through the upper and lower halves of operating winding 470. These two equal currents are differential in the operating windings and do not operate the receiver 1262. From the lower half of the winding 470 of the receiver 1262 the current passes through the artificial line 1260 to earth. From the upper half of the winding 470 of the receiver 1262 the current passes through the line wire 1251 and through the upper half of the operating winding 470 of receiver 1263 thence in part through the resistance 1255 to earth and in part through the lower half of the winding 470 and through the artificial line 1261 to earth, thus operating receiver 1263.

The system of Figure 36, therefore, is a simple differential duplex or two-way system showing the adaptation of our invention to prior telegraph practice. The signal from the sender 1252 does not operate its own receiver 1262 but operates distant receiver 1263. Likewise, signals from sender 1253 will not operate its receiver 1263 but will operate receiver 1262.

Figure 37 illustrates the adaptation of our invention to the system of the well known Wheatstone bridge duplex, comprising two stations connected by line wire 1271. The two stations have two single-current senders 1272 and 1273 of the type shown at 602, Figure 17, each sender in connection with two of the four equal bridge-arm resistances, 1274, 1275, 1276 and 1277. The two pairs of bridge arms have two ballast resistances 1278 and 1279 for limiting the current value of the line signals, two artificial lines or networks 1282 and 1283 for balancing currents in the two resistances of each pair of bridge arms, and two batteries 1284 and 1285, with like poles connected to earth, for producing line signal currents whose durations are determined by the two senders. There are also two receivers, 1286 and 1287, of the type shown in Figures 18, 19 and 20. Label numbers below 1271 will be understood from the earlier parts of this description.

Line wire 1271 is connected to the upper ends of resistances 1274 and 1275. The lower ends of those resistances and upper ends of resistances 1276 and 1277 are connected together and to wires 1290 and 1291 respectively, thus extending the line circuit to the central tongues of the two cam switches 761. Line batteries 1284 and 1285 are connected through the ballast resistances 1278 and 1279 to the open tongues of switches 761 and to wires 210 of their respective senders, thus extending the battery potentials in readiness to meet the line conductors in the points of the senders. Lower ends of the resistances 1276 and 1277 are connected to artificial lines 1282 and 1283 and to earth, to balance the bridge-system.

Receiver 1286 is connected at points of equal potential, namely, to upper end of resistance 1274 and to lower end of resistance 1276; and from resistance 1274, through wire 1292 to central tongue of cam switch 782, and from resistance 1276 through winding 470 to the lower contact of cam switch 782; also from resistance 1276 through wire 1293 and through start-stop magnet 1288 and wire 1294 to upper contact of switch 782.

Receiver 1287 is connected in similar manner to upper end of resistance 1275 and to the lower end of resistance 1277; and from the resistance 1275 through wire 1295 to central tongue of switch 782; and from the resistance 1277 through winding 470 to the lower contact of switch 782; also from the resistance 1277 through the wire 1296 and through start-stop magnet 1289 and wire 1297 to the upper contact of switch 782.

In operation, both shafts 56 are turning at a uniform rate of speed. At each brief operation of switch 761 by cam 760 in sender 1272, a circuit is closed for current from earth through battery 1284, resistance 1278, outer contact and central tongue of operated switch 761, wire 1290 which then divides partly through resistance 1276 and artificial line 1282 to earth and partly through resistance 1274, line wire 1271, wire 1295, central tongue and upper contact of switch 782, wire 1297, starting magnet 1299, wire 1296, and artificial line 1283 to earth, the starting magnet 1289 being shunted by the two resistances 1275 and 1277 in series.

Receiver 1286 is connected to this circuit at two points of equal potential and therefore does not receive current and therefore does not operate. Starting magnet 1289 is energized and operates its armature with stop dog 809 to release stop wheel 805, and shaft 552 makes one revolution. At the start of the revolution of shaft 552 of receiver 1287, cam 790 releases the switch 782 of this receiver. During the revolution of shaft 552 at the receiver 1287 and of shaft 56 at sender 1272, brush 200 engages a selected code disc 201, code signals will be sent over the circuit from earth through battery 1284, resistances 1278, wire 210, code disc 201, brush 200, wire 209, contact and central tongue of unoperated switch 761, wire 1290, thence in part through resistance 1276 and artificial line 1282 to earth and in part through resistance 1274, line wire 1271, wire 1295, central tongue and lower contact of switch 782, operating winding 470, and artificial line 1283 to earth. Operating coil 470 is shunted by the two resistances 1275 and 1277 in series. Operating winding 470 of the receiver 1287 is operated and record is made of the code signals as disclosed in the description of Figure 20.

In like manner operation of sender 1273 will operate receiver 1286 without operating receiver 1287.

Thus the system of Figure 37 illustrates the simplicity of the application of this improved system of telegraphy to one of the standard systems of the known telegraphic art, namely the Wheatstone bridge duplex.

Figure 35 illustrates the ease of adaptation of this invention to the standard line circuits of the present telegraph practice. In this figure, line wire 1301 connects the right and left stations. The two stations have two sending relays, 1302 and 1303, associated with two local sending batteries 1304 and 1305 which serve to energize the windings of these relays under control of a sender to be described. Two positive line batteries 1306 and 1307 and two negative line batteries 1308 and 1309, act through four ballast resistances 1312, 1313, 1314 and 1315 and through the relay points to two relay tongues 1316 and 1317 to supply positive or negative signalling currents to the line.

Two artificial lines or networks 1318 and 1319 are connected to the lower terminals of two differential polar receiving line relays 1320 and 1321. In connection with the two receiving line relays 1320 and 1321, four local batteries 1322, 1323, 1324 and 1325 and four local ballast resistances 1326, 1327, 1328 and 1329 supply local currents of two polarities to the two tongues 1330 and 1331 of polar relays 1320 and 1321.

The upper windings of differential polar relays 1320 and 1321 are connected to line wire 1301. The two windings of relay 1320 are connected together and are connected by the wire 1332 to relay tongue 1316 thus completing the path from line batteries 1306 and 1308 to line wire 1301. Likewise, the two windings of relay 1321 are similarly connected together and by wire 1333 to relay tongue 1317 thus completing the path from line batteries 1307 and 1309 to line wire 1301.

The assembly of parts thus described comprises a well known arrangement of line and local circuits and relays for a double-current differential duplex system and may be equipped with either manual or automatic telegraph apparatus according to present practice. Our improved system is adapted readily to a system of such nature either for synchronous or for start-stop transmission.

In Figure 35 there is shown further the necessary equipment to adapt this system for start-stop transmission according to our invention. Sender 1340 is identical with sender 602 of Figure 17 and has central tongue of cam switch 761 connected by wire 1341 through winding of sending relay 1302. The winding is further connected to battery 1304 and then is connected by wire 1342 to the right contact of the cam switch 761 and thence further by the wire 212 to all of the code discs 201. The wire 767 connects the left contact of cam switch 761 to sending brush 200.

Sender 1345 similarly has central tongue of its cam switch 761 connected through wire 1346 to the winding of the sending relay 1303. The winding is further connected to battery 1305 which then is connected by the wire 1343 to the right contact of the cam switch 761 and thence further by the wire 212 to all of the code discs 201.

Receivers 1350 and 1360 are similar mechanically to the receiver of Figure 20 with relay 784b eliminated. The central tongue of the cam switch 782 of receiver 1350 is connected by wire 1351 to tongue 1330 of polar relay 1320. Battery 1322 is connected by wire 1352 to operating coil 470 and battery 1324 is connected by wire 1353 to operating coil 470. Starting magnet 818 is connected by wire 1354 to the upper contact of cam switch 782 and also is connected by wire 1355 to the negative terminal of battery 1324. The receiver 1360 is similarly connected as follows. The tongue of cam switch 782 is connected by the wire 1361 to tongue 1331 of the polar relay 1321. Battery 1323 is connected by wire 1362 to operating coil 470 and battery 1325 is connected by wire 1363 to operating coil 470. Start magnet 818 is connected by wire 1364 to the upper contact of cam switch 782 and also is connected by the wire 1365 to the negative terminal of the battery 1325.

The apparatus is shown in the position of rest with the receivers stopped and each in condition to be started by the distant sender. The sending relay 1302 is shown de-energized. It may be charged by movement of the central tongue of sending switch 761 against its right contact, or it may be charged by the engagement of the sending brush 200 with the code discs 201. Cam switches 782 are shown with the tongues against their upper contacts, thereby prepared for the operation of starting magnets 818 when tongues 1330 or 1331 of polar relays 1320 and 1321 move against their upper contacts. With the tongue of relay 1320 against its lower contact as shown, starting magnet 818 does not receive current. With cam switch 782 in this position operating winding 470 does not receive current. The armature of the polar relay 1320 is held in the position shown by current through battery 1308, resistance 1314, tongue 1316, wire 1332, lower winding of relay 1320 and artificial line 1318 to earth.

If communication is to be sent from transmitter 1340 to receiver 1360, as has been described in connection with Figure 17, cam 760 operates briefly cam switch 761, and sending brush 200 then engages the code disc 201 in an interrupted manner to send code signals. Operation of cam switch 761 closes briefly the circuit from the battery 1304 through the wire 1342, right contact and tongue of the cam switch 761, wire 1341 and the winding of the sending relay 1302 back to the battery 1304. The sending relay 1302 operates and sends a brief "start" current over the circuit from earth through battery 1306, resistance 1312, tongue 1316, wire 1332 to the two windings of polar relay 1320, part of the current flowing through the lower winding of relay 1320 and through artificial line 1318 to earth and part of the current flowing through upper winding of relay 1320 thence through line wire 1301 through both windings of polar relay 1321 and artificial line 1319 to earth. In response to this current polar relay 1321 pulls tongue 1331 upward and closes a circuit for the start magnet 818 of the receiver 1360 from the tongue 1331 through resistance 1327, battery 1323, wire 1362, wire 1363 and battery 1325, wire 1365, magnet 818, wire 1364, upper contact and tongue of cam switch 782 and wire 1361. Magnet 818 operates and permits the shaft 552 to start as described in connection with Figure 20.

Starting of shaft 552 causes cam 790 to release cam switch 782 thus disconnecting starting magnet 818 from tongue 1331 and connecting operating winding 470 of receiver 1360 to tongue 1331. Thereafter every closed interval of contact between sending brush 200 and code disc 201 of sender 1340 will charge sending relay 1320 and cause a current from earth through battery 1306, resistance 1312, tongue 1316, wire 1332, relay 1320, line wire 1301, relay 1321 and artificial line 1319 to earth. Polar relay 1320 does not operate but polar relay 1321 operates to pull tongue 1331 upward and closes a circuit for current from battery 1323 through wire 1362, operating winding 470, lower contact and tongue of cam switch 782, wire 1361, tongue 1331 and resistance 1327. This current through winding 470 raises printing member to print upon the record tape.

Every open interval between the sending brush 200 and the code disc 201 of sender 1340 will discharge sending relay 1302 and cause a current flow in reverse direction as follows; from earth through battery 1308, resistance 1314, tongue 1316, wire 1332, relay 1320, line wire 1301, relay 1321 and artificial line 1319 to earth. The polar relay 1320 will not operate but the polar relay 1321 operates its tongue downward and closes a circuit for current from battery 1325 through wire 1363, operating winding 470, lower contact and tongue of cam switch 782, wire 1361, tongue 1331 and resistance 1329. This current flows in reverse direction through winding 470 and does not raise or lower the previously raised printing member and therefore no record is printed on the receiving tape for the non-contacting arcs of the transmitting code disc.

When one character has been completed, the cam 790 raises tongue of switch 782 to the position shown in Figure 35 and latch 809 simultaneously engages the printing wheel and stops rotation thereof. The sender 1340 will have reached the position shown also, and transmission of the next character can begin by the "start" pulse. Each revolution of the shaft 552 produces a character and successive characters may be sent.

At the same time and independently of the transmission described above, additional and simultaneous transmission may proceed from the sender 1345 and sending relay 1303 over the line wire 1301 to the polar relay 1320 and to the printer 1350, to which additional transmission the polar relay 1321 is unresponsive and to which the polar relay 1320 is responsive.

It will be seen that the equipment of this invention may be applied to the standard differential polar duplex line system without modifying the arrangements of the circuits as now used, as well as operated over the new recently developed voice, carrier, radio frequency and like channels of communication.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U. S. Letters Patent is:

1. In a facsimile telegraph transmitter, signal-control members, one individual to each character transmitted, and signal-control elements arranged in a continuous line upon each of said signal-control members and shaped in accordance with a plurality of parallel scanning lines in the image to be transmitted.

2. In a system of communication for the distant transmission of intelligence composed of a series of symbols, a transmitter having a transmitting element for each symbol, each element having a single line of signal controlling portions thereon corresponding to a scanning of its symbol, and means for directly recording a facsimile of a selected symbol by signals received from its transmitting element.

3. In a system of communication for the distant transmission of intelligence composed of a series of symbols, a transmitter having a transmitting element for each symbol, each element having a single line of individual characteristics distinguishing it from all other elements formed in accordance with a scanning of its symbol, and means for recording signals in areal form in accordance with the individual characteristics of each said element.

4. In a system of communication for the distant transmission of intelligence composed of a series of symbols formed of light and dark areas, a transmitter having an individual transmitting element for each symbol, each element having an individual shape to provide in one line marking and spacing portions corresponding to the light and dark areas in the scanning of its symbol, means for transmitting signals in accordance with the shape of a selected element, and means for directly reproducing at a receiver a facsimile of the symbol corresponding to the selected element.

5. In a facsimile telegraph system, a transmitter having a transmitting element for each symbol, each element having a single line of signal controlling portions thereon corresponding to a scanning of its symbol and a symbol space, means for successively transmitting signals by said elements, and receiving means for facsimileing said symbols and symbol spaces.

6. In a facsimile telegraph system, a transmitter having a plurality of transmitting elements operable in cycles, each having a peripheral lineal shape individual to the scanning signals of its allotted symbol, and means for successively selecting said elements for the transmission of a message, each complete cycle of movement of one element transmitting signals to cause reproduction of the symbol allotted thereto and a space between adjacent symbols.

7. A system of communication for the distant transmission of intelligence composed of a series of symbols, which comprises individual transmitting control members, one for each symbol, signal-control elements arranged in a continuous line upon each of said signal-control members and shaped in accordance with a plurality of parallel scanning lines in the corresponding symbol, and means for selecting said control members and for causing the control elements thereof to transmit signals and cause facsimile reproduction in areal form of selected symbols in response to said transmitted signals.

8. The method of operating a system of communication for the distant transmission of intelligence by means of a series of symbols, which comprises providing a lineal transmitting control element for each symbol, each element having individual characteristics distinguishing it from all other elements, of such a nature as to transmit directly signals from which a facsimile reproduction in areal form of the symbol corresponding thereto may be made and recording the information to be transmitted upon a control form in code manner, each code operating to select a symbol control element and to transmit therefrom.

9. The method of operating a system of communication for the distant transmission of intelligence composed of a series of symbols, which comprises providing a rotary transmitting element for each symbol, each element having an individual continuous lineal peripheral shape distinguishing it from all other elements, recording the information to be transmitted upon a control form in code manner, each code operating to select a transmitting element and transmitting signals in accordance with the peripheral shape of the selected element, and directly producing in areal form a facsimile of the symbol corresponding to the selected element in response to said signals.

10. A method of prescanning symbols for facsimile transmission, comprising the steps of providing a surface formed by successive rows of small contrasting unit areas constituting the symbol to be transmitted spaced successively farther from one edge of said surface, and providing a control element for one symbol having lineally continuous contact surfaces corresponding to all of the successive rows of contrasting unit areas for said one symbol.

11. A method of transmission of intelligence by prescanning symbols for facsimile transmission, comprising the steps of providing a surface of small contrasting unit areas forming the symbol to be transmitted spaced from one vertical edge and one horizontal edge of said surface, providing control elements, one for each symbol and each having contiguous lineally arranged contact surfaces corresponding to all of the contrasting unit areas for the symbol, recording the intelligence upon a control form, selecting said control elements one by one under control of the control form, and transmitting from each one as selected.

12. In a facsimile telegraph system, a transmitter having a plurality of transmitting elements each having lineally arranged control surfaces corresponding to the light and dark areas of a scanned character, and means for transmitting signal impulses controlled by said elements.

13. In a facsimile telegraph system, a transmitter having a plurality of transmitting elements each having a series of lineally arranged spaced contact segments, said segments and the spaces therebetween corresponding to the dark and light areas of a scanned character, means for transmitting signal impulses directly to line by said segments, and means for recording the signals in areal form to reproduce the character.

14. In a facsimile telegraph system, a transmitter having a plurality of transmitting elements each having a series of spaced contact segments, said segments and the spaces therebetween corresponding to the dark and light areas of a scanned character and arranged lineally to represent the scanning signals of the character, contact means positioned to engage said contact segments, and means for causing said contact means to successively engage the contact segments of a selected transmitting element to transmit signal impulses corresponding to a scanning of the character of the selected element.

15. In a facsimile telegraph system, a transmitter having a plurality of transmitting elements each having a series of spaced contact segments, said segments and the spaces therebetween corresponding to the dark and light areas of a scanned character, means for rotating said elements, and single contact means engageable successively with the segments of a transmitting element to transmit directly from said element during its rotation the signal impulses corresponding to a scanning of the selected character.

16. In a facsimile telegraph system, a transmitter having a plurality of transmitting elements each having a series of spaced contact segments, said segments and the spaces therebetween corresponding to the light and dark areas of a scanned character, means for continuously driving said elements, and contact means selectively positioned to successively engage the segments of one element to transmit signal impulses.

17. In a facsimile telegraph system, a transmitter having a perforated control member, a plurality of feeler fingers engageable with said perforated member and selectively positioned in accordance with the perforations therein, a plurality of transmitting elements each having signal impulse controlling portions corresponding to a scanning of a character, and means governed by the position of said feeler fingers for transmitting signal impulses by one of said elements.

18. The method of operating a system of communication for the distant transmission of a message composed of a series of characters, which comprises recording the message in code upon a perforated tape character by character, translating said coded characters one by one into a series of electrical conditions corresponding to a scanning of the characters of the message, transmitting the electrical conditions character by character each character preceded by a starting condition, and facsimileing the message in accordance with the electrical conditions.

19. The method of operating a system of communication for the distant transmission of a message composed of a series of characters, which comprises coding the message according to a permutation code, translating said coded message into a series of electrical conditions corresponding to a scanning of the characters of the message character by character, transmitting the electrical conditions with a start condition preceding each character, and facsimileing the message under control of the electrical conditions.

20. In a facsimile telegraph system, a transmitter having a plurality of tape-controlled feeler fingers, a plurality of transmitting elements, means for periodically selecting a transmitting element by said feeler fingers, manually operable means for locking said feeler fingers in non-selecting position, and interlocking mechanism for retaining said manually operable means in locking position until said transmitter is positioned for initiating transmission.

21. In a facsimile telegraph transmitter, a plurality of transmitting elements each containing a record of the scanning code of one character, means for rotating all of said elements continuously, each revolution thereof effecting the transmission of one character, a plurality of permutation bars, latch means for retaining said bars in a selected code combination, means controlled by said bars when in selected code combination for transmitting impulses by one of said elements; a perforated tape, a plurality of feeler fingers for engagement in code manner with said tape, and means operative during each revolution of said transmitting elements for causing said feeler fingers to engage with said tape in code manner, for releasing said permutation bars from said latch means, and for resetting said bars in accordance with the code position of said feeler fingers.

22. A continuous high-speed facsimile telegraph transmitter, comprising a plurality of transmitting elements, each bearing a lineally arranged record of scanning signals, means for rotating said elements continuously, each revolution thereof occupying the interval for the complete transmission of one character, selectively controlled mechanism for transmitting impulses by one of said elements, means for operating said selective mechanism during transmission of one character for the selection of a succeeding character, and means for recording in parallel lines and in areal form the transmitted impulses to reproduce the character.

23. A continuous high-speed facsimile telegraph transmitter, comprising a plurality of transmitting elements each having spaced contact segments, said segments and the spaces therebetween corresponding to the light and dark areas of a scanned character and a character space, means for rotating said elements, contact means engageable with the segments of one element for transmitting impulses, selective mechanism for causing said contact means to engage its element, and means for operating said selective mechanism during the transmission of one character for the selection of a succeeding character.

24. In a telegraph system, a continuously revolving member comprising a plurality of corrugated peripheries each representing a character and the corrugation of each periphery representing in one continuous line the areal scanning of the character represented, and selective means for contacting electrically with one of said peripheries whereby electrical currents are generated corresponding to the scanning of the characters.

25. In a telegraph system, a continuously revolving member comprising a plurality of code disks each representing a character whose areal scanning is represented by one continuous line of corrugations upon its edge, electrical contact brushes for each disk, means to select a brush, and means to cause the selected brush to engage a corresponding disk through a predetermined angle of revolution.

26. In a telegraph system, means for recording a series of characters, a plurality of transmitting elements, one for each of said characters, each said element comprising a single-line record of the areal scanning of its character, a plurality of manual keys, one for each said transmitting element, means under control of said keys for rendering effective said transmitting elements, and means associated with each said transmitting element to transmit to said recording means a signal having a plurality of intervals of one or the other of two electrical characteristics and representing the scanning of the character.

27. In a telegraph system, a transmitter having as parts thereof a plurality of facsimile sub-transmitters, a facsimile recorder, tape controlled means to control said transmitter automatically by the perforations in said tape to select a sub-transmitter and to transmit therefrom to said facsimile recorder.

28. In a facsimile telegraph transmitter, a member having a surface arranged with a plurality of individual areas, each area being formed differently of the other areas in accordance with a continuous lineal arrangement of a plurality of scanning lines of the character to be transmitted, a keyboard, and means responsive to the operation of said keyboard for rendering the individual areas effective for the transmission of impulses.

29. In a facsimile telegraph transmitter, a drum having its periphery divided into a plurality of individual areas, each area being formed differently of the other areas in accordance with a continuous lineal arrangement of a plurality of scanning lines of the character to be transmitted, a keyboard, and means responsive to the operation of said keyboard for rendering the individual areas of the drum effective for the transmission of impulses indicative of the character.

30. In a facsimile telegraph system, a transmitter having a marked control member, a plurality of feeler fingers selectively controlled by the markings in the control member, a plurality of permutation bars set in accordance with the position of said fingers, a plurality of transmitting elements, each having signal impulse controlling portions corresponding to a scanning of a character, and a member selected upon the permuted setting of said bars for rendering said transmitting elements effective for transmitting current impulses.

EDWARD E. KLEINSCHMIDT.
EDWARD F. KLEINSCHMIDT.